(12) United States Patent
Wang et al.

(10) Patent No.: US 11,066,923 B2
(45) Date of Patent: Jul. 20, 2021

(54) SYSTEM AND METHOD FOR GENERATING OUTPUT OF A DOWNHOLE INERTIAL MEASUREMENT UNIT

(71) Applicant: HRL LABORATORIES, LLC, Malibu, CA (US)

(72) Inventors: Shuoqin Wang, Oak Park, CA (US); Logan D. Sorenson, Thousand Oaks, CA (US); David L. Walter, Los Angeles, CA (US); Adour V. Kabakian, Los Angeles, CA (US); Hung Nguyen, Los Angeles, CA (US); Raviv Perahia, Calabasas, CA (US); David T. Chang, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 420 days.

(21) Appl. No.: 16/018,695

(22) Filed: Jun. 26, 2018

(65) Prior Publication Data

US 2018/0371894 A1 Dec. 27, 2018

Related U.S. Application Data

(60) Provisional application No. 62/525,051, filed on Jun. 26, 2017.

(51) Int. Cl.
*E21B 7/04* (2006.01)
*G01C 19/5776* (2012.01)
(Continued)

(52) U.S. Cl.
CPC ............ *E21B 47/0228* (2020.05); *E21B 7/04* (2013.01); *E21B 47/022* (2013.01); *E21B 47/06* (2013.01);
(Continued)

(58) Field of Classification Search
CPC .... E21B 47/0228; E21B 47/022; E21B 47/06; E21B 7/04; G01C 21/165; G01C 17/02; G01C 19/5776; G01C 21/16; G01V 3/26
See application file for complete search history.

(56) References Cited

U.S. PATENT DOCUMENTS 6,714,870 B1    3/2004 Weston et al.
10,274,509 B1 * 4/2019 Challoner .............. G01C 21/16
(Continued)

FOREIGN PATENT DOCUMENTS

WO    WO 2016/178619 A1    11/2016

OTHER PUBLICATIONS

International Search Report and Written Opinion for International Application No. PCT/US2018/039534, dated Oct. 26, 2018 (18 pages).

*Primary Examiner* — Stephanie E Bloss
(74) *Attorney, Agent, or Firm* — Lewis Roca Rothgerber Christie, LLP

(57) ABSTRACT

A method for generating an output of a downhole inertial measurement unit (IMU) includes: generating a trajectory between a plurality of survey points of a planned well data as a function of time, wherein the planned well data includes a plurality of three-dimensional coordinates corresponding to the survey points of an underground planned well are used to generate a trajectory comprising a plurality of trajectory coordinates between the consecutive ones of the survey points; generating sensor data for each of the trajectory coordinates as a function of time based on the geodetic reference parameters, the generated sensor data comprising: generated accelerometer output; generated gyroscopic output; and generated magnetometer output; and outputting the generated accelerometer output; the generated gyroscopic
(Continued)

output; and the generated magnetometer output as a function of time as a generated output of the downhole IMU.

23 Claims, 22 Drawing Sheets

(51) Int. Cl.
*E21B 47/0228* (2012.01)
*E21B 47/06* (2012.01)
*G01C 21/16* (2006.01)
*E21B 47/022* (2012.01)
*G01C 17/02* (2006.01)

(52) U.S. Cl.
CPC ........ *G01C 21/165* (2013.01); *E21B 2200/20* (2020.05); *G01C 17/02* (2013.01); *G01C 19/5776* (2013.01)

(56) References Cited

U.S. PATENT DOCUMENTS

| | | | |
|---|---|---|---|
| 2004/0089474 A1* | 5/2004 | Noureldin | E21B 47/022 175/45 |
| 2004/0111212 A1* | 6/2004 | Broeck | G01C 23/00 701/533 |
| 2006/0006000 A1 | 1/2006 | Weston et al. | |
| 2009/0120690 A1* | 5/2009 | Phillips | E21B 44/00 175/45 |
| 2009/0314546 A1* | 12/2009 | Mintchev | E21B 47/024 175/45 |
| 2010/0193245 A1* | 8/2010 | Glomsrud | E21B 44/00 175/45 |
| 2015/0247729 A1* | 9/2015 | Meduna | G01C 21/165 702/150 |
| 2016/0145998 A1 | 5/2016 | Myeong et al. | |
| 2016/0363460 A1* | 12/2016 | Sarbishei | G01C 25/005 |
| 2017/0350704 A1* | 12/2017 | Ingvalson | G01C 25/005 |
| 2018/0010914 A1* | 1/2018 | Hardt | G01C 21/165 |
| 2018/0149480 A1* | 5/2018 | Wang | G01C 21/165 |

\* cited by examiner

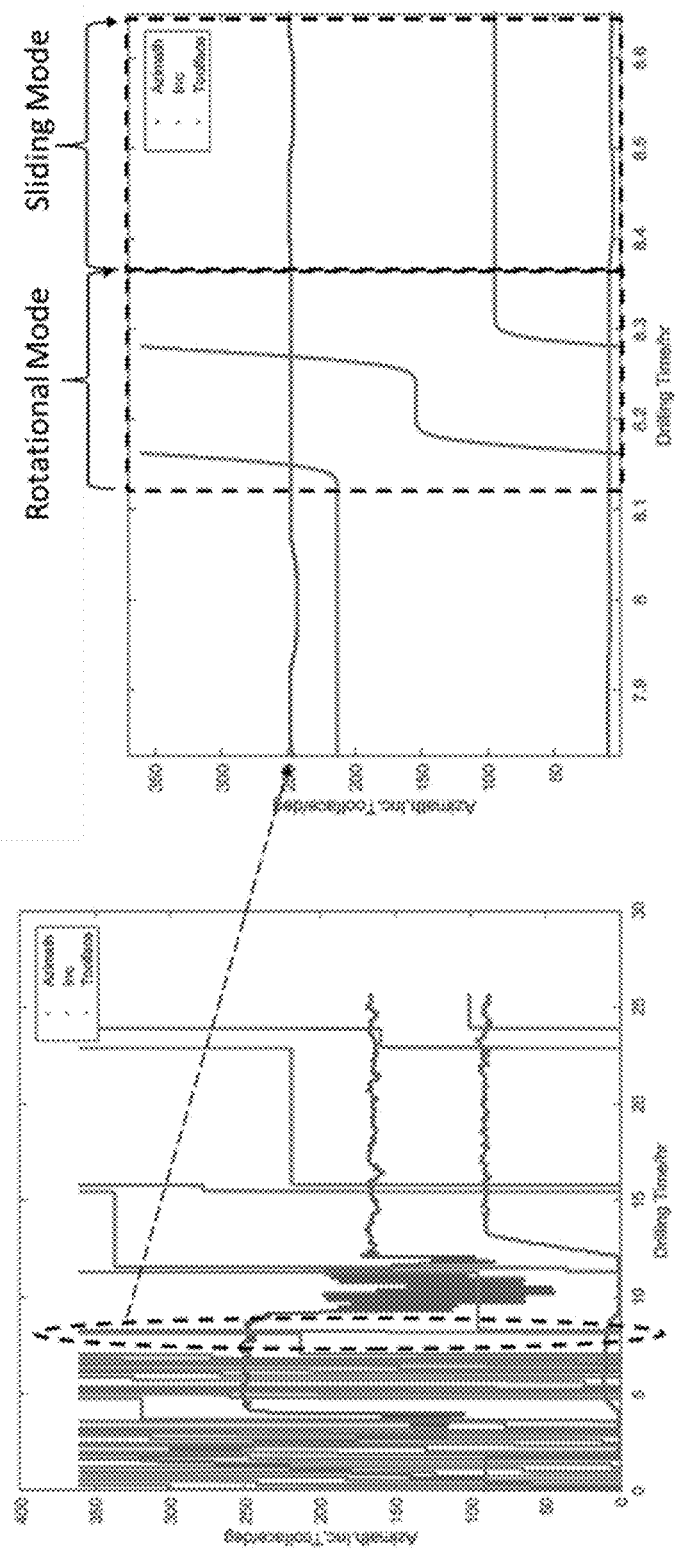

SYSTEM AND METHOD FOR GENERATING OUTPUT OF A DOWNHOLE INERTIAL MEASUREMENT UNIT

CROSS-REFERENCE TO RELATED APPLICATION(S)

This application claims priority to and the benefit of U.S. Provisional Patent Application No. 62/525,051 "SYSTEM AND METHOD FOR DOWNHOLE IMU SIMULATION," filed in the United States Patent and Trademark Office on Jun. 26, 2017, the entire disclosure of which is incorporated by reference herein.

FIELD

Aspects of embodiments of the present invention relate to systems and methods for generating output of a downhole inertial measurement unit and, more particularly, generating a downhole inertial measurement unit by receiving planned well data and geodetic reference parameters to generate the data output of the sensors.

BACKGROUND

Some wellbore drilling technologies employ a bottom hole assembly (BHA) that may include the use of a rotary steerable drilling system. This technology allows the users to change the direction of the drill bit during drilling, thereby enabling the drilling of wells having horizontal sections or allowing the wells to take paths around obstacles or access targets that would not otherwise be reachable using previous drilling techniques. The bottom hole assemblies (BHAs) are used for directional drilling and may contain various inertial measurement units (IMUs) to provide information (measurement while drilling or MWD information) about the current status of the drill bit.

SUMMARY

Aspects of embodiments of the present invention relate to systems and methods for generating the output of a downhole inertial measurement unit (IMU).

Aspects of embodiments of the present invention relate to a system and method for generating a downhole inertial measurement unit as a means for verifying and validating the downhole inertial measurement unit's sensors are working properly and to further improve the implemented algorithms. The downhole inertial measurement unit is composed of sensor packages that may include accelerometers, gyroscopes, magnetometers and pressure sensors for providing information in real-time to enable Autonomous Guidance While Drilling (AGWD). An Autonomous Guidance While Drilling (AGWD) system optimally estimates the trajectory of a borehole with minimum error in real-time. The system may provide real-time autonomous navigation and guidance for the bottom hole assembly (BHA) employed during wellbore drilling, which may include a steerable drill bit to enable true autonomous drilling.

A method for generating an output of a downhole inertial measurement unit (IMU) includes: generating a trajectory between a plurality of survey points of a planned well data as a function of time, the planned well data comprising a plurality of three-dimensional coordinates corresponding to the survey points of an underground planned well, the trajectory comprising a plurality of trajectory coordinates between consecutive ones of the survey points; generating sensor data for each of the trajectory coordinates as a function of time based on the geodetic reference parameters, the generated sensor data including: generated accelerometer output; generated gyroscopic output; and generated magnetometer output; and outputting the generated accelerometer output; the generated gyroscopic output; and the generated magnetometer output as a function of time as a generated output of the downhole IMU.

The method may further include: generating a trajectory between the survey points at a time step of 1 per second to 1000 per second.

Each of the generated trajectory coordinates may include a three-dimensional position, a three-dimensional orientation, and a timestamp.

Each three-dimensional orientation may include an azimuthal angle, an inclination angle, and a toolface angle of a drill bit.

The method may further include: generating the accelerometer output in accordance with the three-dimensional positions and the timestamps of the trajectory coordinates; generating the gyroscopic output in accordance with the three-dimensional orientation and the timestamps of the trajectory coordinates; and generating the magnetometer output in accordance with: the geodetic reference parameters; and the three-dimensional positions and the timestamps of the trajectory coordinates.

The computing the generated accelerometer output may include converting generated accelerometer data from a navigation frame to a body frame of a drill bit, wherein the computing the generated gyroscopic output may include converting generated gyroscopic data from the navigation frame to the body frame of the drill bit, and wherein the computing the generated magnetometer output may include converting generated magnetometer output from the navigation frame to the body frame of the drill bit.

The method may further include: receiving sensor noise parameters; and adding sensor noise to the generated accelerometer output, the generated gyroscopic output, and the generated magnetometer output. The sensor noise may include at least one of: quantization noise; white noise; bias instability; bias random walk; and bias ramp.

The method may further include, between each consecutive pair of survey points: determining whether the trajectory between the consecutive pair of survey points is a rotational mode trajectory or a sliding mode trajectory; in response to determining the rotational mode trajectory, adding rotational mode drilling noise to the generated accelerometer output, the generated gyroscopic output, and the generated magnetometer output; and in response to determining the sliding mode trajectory, adding sliding mode drilling noise to the generated accelerometer output, the generated gyroscopic output, and the generated magnetometer output.

The method may further include verifying the generated output of the downhole IMU by: supplying the generated accelerometer output, the generated gyroscopic output, and generated magnetometer output to an inertial navigation system (INS) to generate an INS system trajectory; and verifying the generated output of the IMU when a difference between the INS system trajectory and the trajectory computed from the planned well data is below a threshold value.

The sensor data may further include pressure data.

According to one embodiment of the present invention, a system for generating the data output of a downhole inertial measurement unit (IMU) includes: a processor; and a memory storing instructions that, when executed by the processor, cause the processor to: generate a trajectory between the survey points of planned well data as a function of time, the planned well data comprising a plurality of three-dimensional coordinates corresponding to the survey points of an underground planned well, the trajectory comprising a plurality of trajectory coordinates between consecutive ones of the survey points; and generate sensor data for each of the trajectory coordinates as a function of time based on the geodetic reference parameters, the generated sensor data including: generated accelerometer output; generated gyroscopic output; and generated magnetometer output.

The system for generating output of a downhole inertial measurement unit (IMU) may be implemented on a real-time target machine for use as hardware-in-the-loop.

The real-time target machine using the generated output of a downhole inertial measurement unit (IMU) may further be configured to send commands to a motion controller to control a nonmagnetic motion simulator apparatus.

Each of the trajectory coordinates may include a three-dimensional position, a three-dimensional orientation, and a timestamp.

Each three-dimensional orientation may include an azimuthal angle, an inclination angle, and a toolface angle of a drill bit.

The memory may further store instructions that, when executed by the processor, cause the processor to: compute the generated accelerometer output in accordance with the three-dimensional positions and the timestamps of the trajectory coordinates; compute the generated gyroscopic output in accordance with the three-dimensional orientation and the timestamps of the trajectory coordinates; and compute the generated magnetometer output in accordance with: the geodetic reference parameters; and the three-dimensional positions and the timestamps of the trajectory coordinates.

The instructions for computing the generated accelerometer output may include instructions that, when executed by the processor, cause the processor to convert generated accelerometer data from a navigation frame to a body frame of a drill bit, wherein the instructions for computing the generated gyroscopic output may include instructions that, when executed by the processor, cause the processor to convert generated gyroscopic data from the navigation frame to the body frame of the drill bit, and wherein the instructions for computing the generated magnetometer output may include instructions that, when executed by the processor, cause the processor to convert generated magnetometer output from the navigation frame to the body frame of the drill bit.

The memory may further store instructions that, when executed by the processor, cause the processor to: receive sensor noise parameters; and add sensor noise to the generated accelerometer output, the generated gyroscopic output, and the generated magnetometer output.

The sensor noise may include at least one of: quantization noise; white noise; bias instability; bias random walk; and bias ramp.

The memory may further store instructions that, when executed by the processor, cause the processor to, between each consecutive pair of survey points: determine whether the trajectory between the consecutive pair of survey points is a rotational mode trajectory or a sliding mode trajectory; in response to determining the rotational mode trajectory, add rotational mode drilling noise to the generated accelerometer output, the generated gyroscopic output, and the generated magnetometer output; and in response to determining the sliding mode trajectory, add sliding mode drilling noise to the generated accelerometer output, the generated gyroscopic output, and the generated magnetometer output.

The memory may further store instructions that, when executed by the processor, cause the processor to verify the generated output of the IMU by: supplying the generated accelerometer output, the generated gyroscopic output, and generated magnetometer output to an inertial navigation system (INS) to generate an INS system trajectory; and verifying the generated output of the IMU when a difference between the INS system trajectory and the trajectory computed from the planned well data is below a threshold value.

According to one embodiment of the present invention, a non-transitory computer readable medium has instructions stored thereon that, when executed by a processor, cause the processor to: generate a trajectory between the survey points of planned well data as a function of time, the planned well data comprising a plurality of three-dimensional coordinates corresponding to the survey points of an underground planned well, the trajectory comprising a plurality of trajectory coordinates between consecutive ones of the survey points; and generate sensor data for each of the trajectory coordinates as a function of time based on the geodetic reference parameters, the generated sensor data comprising: generated accelerometer output; generated gyroscopic output; and generated magnetometer output.

BRIEF DESCRIPTION OF THE DRAWINGS

The accompanying drawings, together with the specification, illustrate exemplary embodiments of the present invention, and, together with the description, serve to explain the principles of the present invention.

FIG. 8A is a graph depicting azimuth, inclination, and toolface (AIT) coordinates as a function of time, as generated according to one embodiment of the present invention.

FIG. 8B is an enlargement of the portion of FIG. 8A indicated with an ellipse.

DETAILED DESCRIPTION

Figure 1:
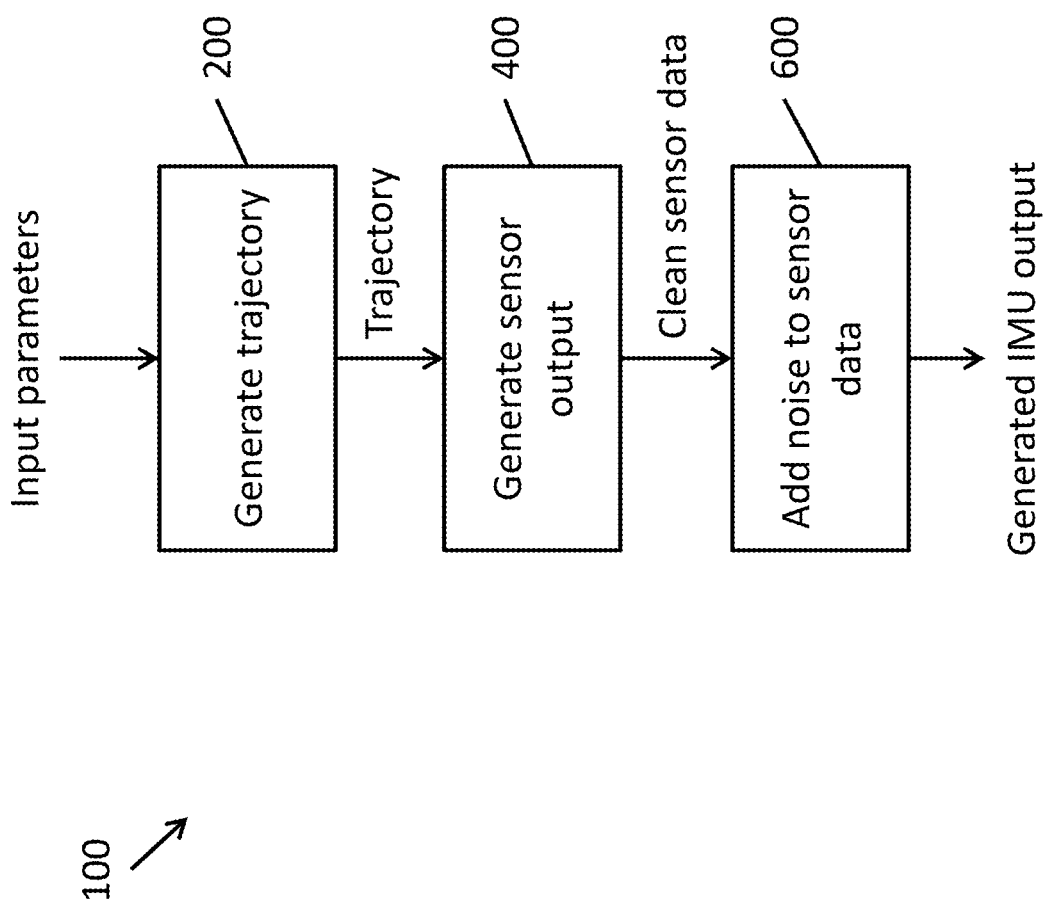
FIG. 1 is a flowchart of a method according to one embodiment of the present invention for generating an output of an inertial measurement unit (IMU) for a particular planned well.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Some drilling technologies involving rotary steerable drilling would be improved by making use of autonomous guidance while drilling (AGWD), in which a controller embedded within the bottom hole assembly (BHA) or drill bit autonomously controls its trajectory. Autonomous guidance while drilling (AGWD) is described in U.S. patent application Ser. No. 15/823,489 "OPPORTUNISTIC SENSOR FUSION ALGORITHM FOR AUTONOMOUS GUIDANCE WHILE DRILLING," filed in the United States Patent and Trademark Office on Nov. 27, 2017, the entire disclosure of which is incorporated by reference herein. This AGWD technology can be analogized to control systems for other autonomous vehicles such as drones and self-driving cars. An autonomous navigation system may receive feedback from sensors regarding its position over time and may adjust its direction of movement based on the feedback. In some technologies such as autonomous airborne drones and terrestrial vehicles, the global positioning system (GPS) may be used to provide highly accurate position and velocity information. On the other hand, an autonomous bottom hole assembly (BHA) with drill bit would operate underground, where GPS signals are generally not available. As a result, positional information for an AGWD system would need to be provided by a downhole inertial measurement unit (IMU), which can provide acceleration data, gyroscopic data, magnetometer data, pressure data and measured depth. The acceleration data, in turn, can provide position and velocity information by integrating the acceleration data over time.

An accurate generator of the output of the type of downhole inertial measurement unit (IMU) ensemble used in a drilling scenario may have applications in testing, comparing, validating and improving navigation algorithms for controlling autonomous guidance while drilling (AGWD) systems. A downhole IMU located on or inside the bottom hole assembly (BHA) generally encounters environments and operating conditions that are different from IMUs used in other contexts such as in aerospace applications and in terrestrial navigation, thereby requiring a specialized system to provide an accurate generated output. For example, an IMU located on or inside the bottom hole assembly (BHA) may be rotating with the BHA and/or the drill bit, and therefore may be rotating at various rates during operation, whereas an IMU in an aircraft or in a terrestrial vehicle will generally have relatively low rates of rotation. As another example, in some embodiments, the output generator makes use of three-dimensional (3D) planned well trajectory data in generating an output of a downhole IMU. Furthermore, the types of external reference sources are different in that GPS data or star tracking are not available, and therefore gyro compassing and magnetic compassing may be used instead, and noise characteristics of downhole IMUs are different from, for example, terrestrial and aerospace applications of IMUs. Moreover, the trajectory estimation is much more difficult in drilling applications than in conventional navigation applications because, in the latter case, there are multiple external references, such as the turns of wheels (odometer), the marks on roads, the star angles, etc. for correcting the bias instability of microelectromechanical systems (MEMS) inertial sensors, while none of these are available in underground drilling.

Accordingly, aspects of embodiments of the present invention are directed to systems and methods for generating the output of downhole IMUs in a manner that takes into account the particular conditions experienced by downhole IMUs, such as IMUs that are attached to bottom hole assemblies (BHAs). These conditions may include, for example, particular linear and angular acceleration profiles as the drill bit moves between stations and particular underground magnetic conditions.

Figure 2A:
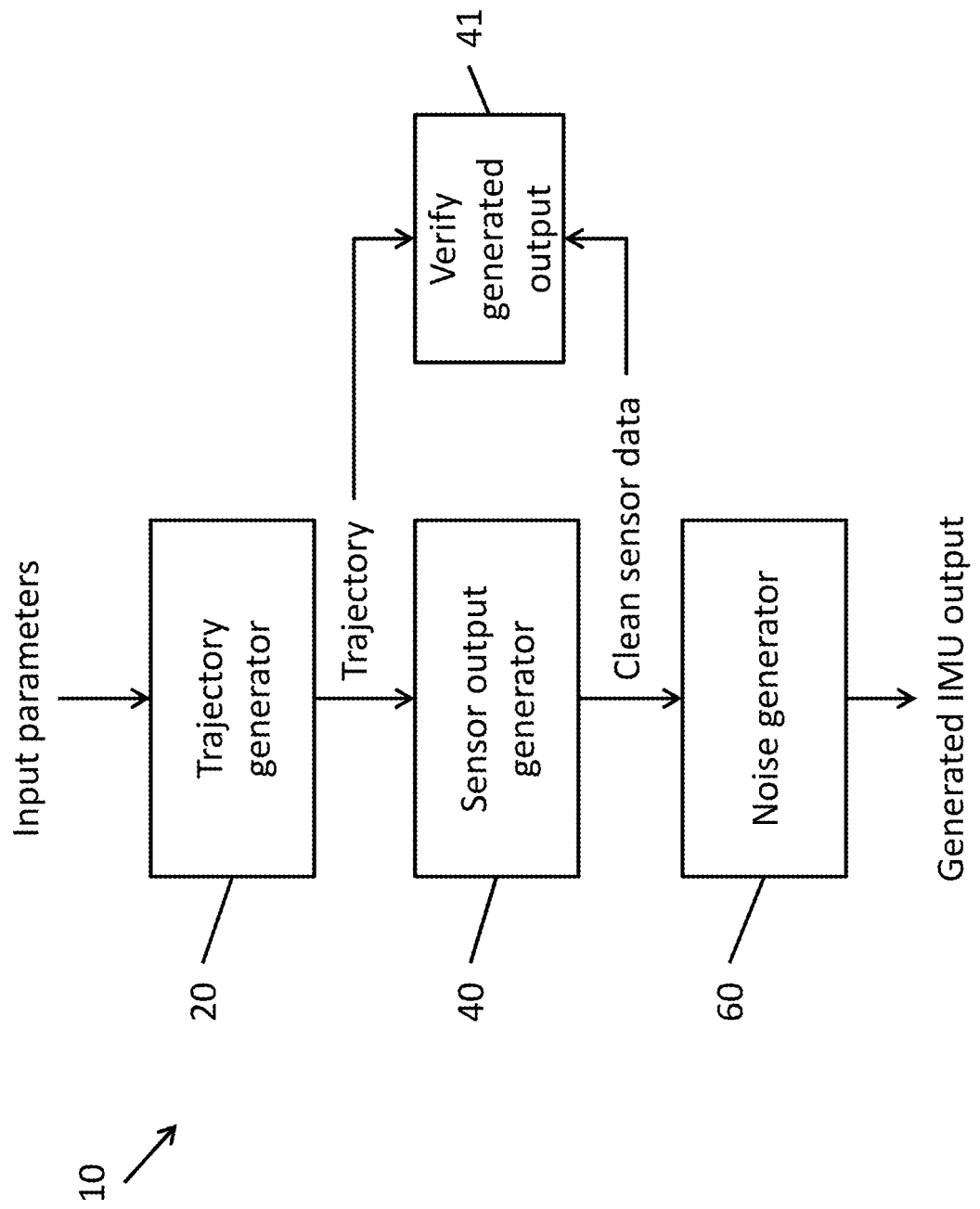
FIG. 2A is a block diagram of a system for generating a trajectory and an inertial measurement unit according to one embodiment of the present invention.
Figure 2B:
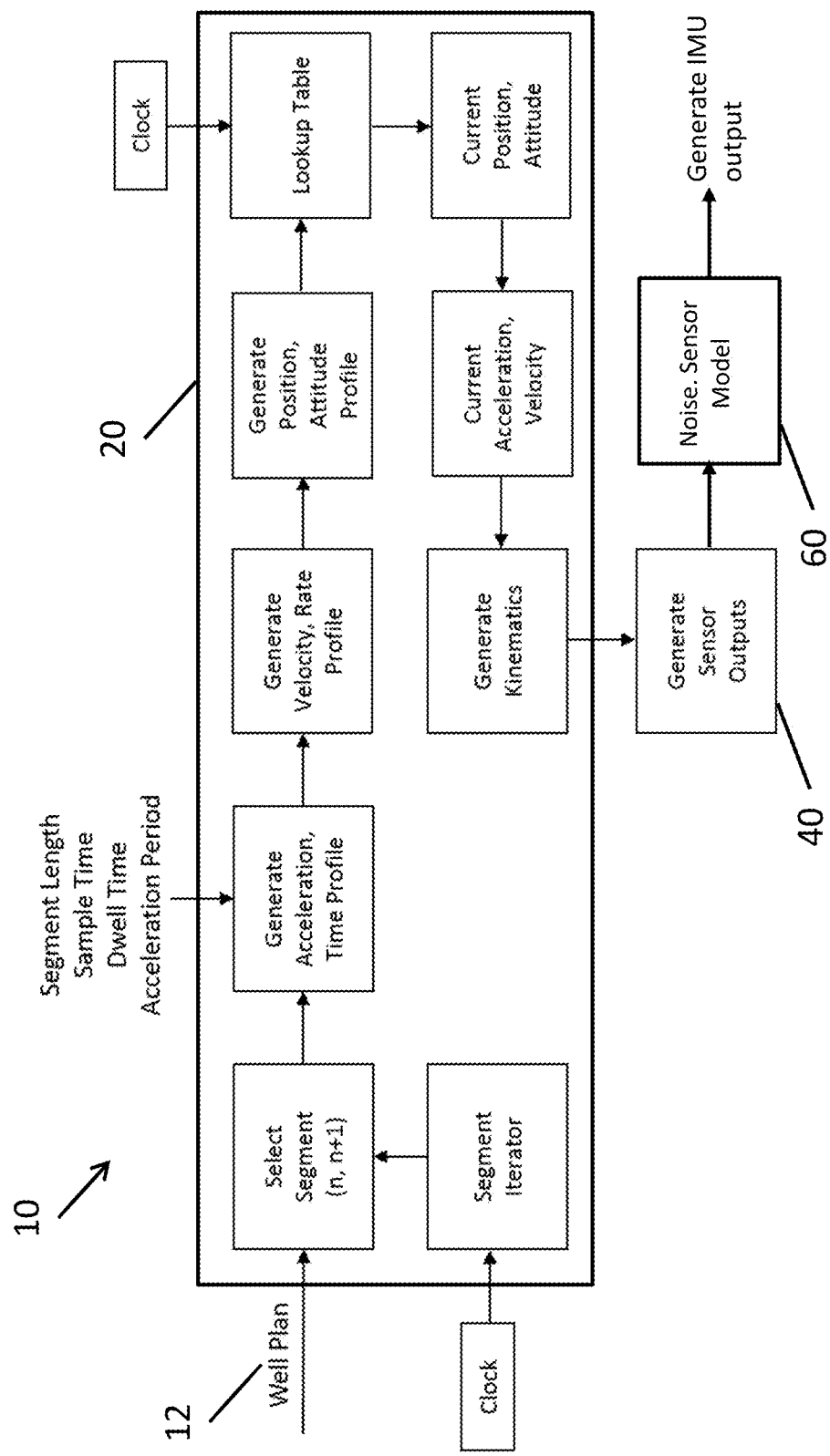
FIG. 2B is a more detailed block diagram of a system for generating a trajectory and an inertial measurement unit according to one embodiment of the present invention.

FIG. 1 is a flowchart of a method according to one embodiment of the present invention for generating an output of an inertial measurement unit (IMU) for a particular planned well. FIG. 2A is a block diagram of a system 10 for generating a trajectory and an inertial measurement unit according to one embodiment of the present invention. FIG. 2B is a more detailed block diagram of a system 10 for generating a trajectory and an inertial measurement unit according to one embodiment of the present invention.

Various embodiments of the present invention may be implemented on a computer processor system that is customized or specialized in accordance with particular computer instructions to perform special purpose operations in accordance with various embodiments of the present invention. Examples of such computer processors or specialized include an application specific integrated circuit (ASIC) having a circuit to implement a simulation, a field programmable gate array (FPGA) having circuitry that is configured (e.g., using with a bit file) to implement a simulation, and a processor (such as a central processing unit and a graphical processing unit) configured by program instructions stored memory coupled to the processor. The instructions and/or techniques may include, for example: the generation of an output of a downhole IMU for a particular planned well, given a set of parameters specifying features of the well and the associated equipment; and generating IMU sensor data using the generated IMU output in accordance with embodiments of the present invention.

Figure 21:
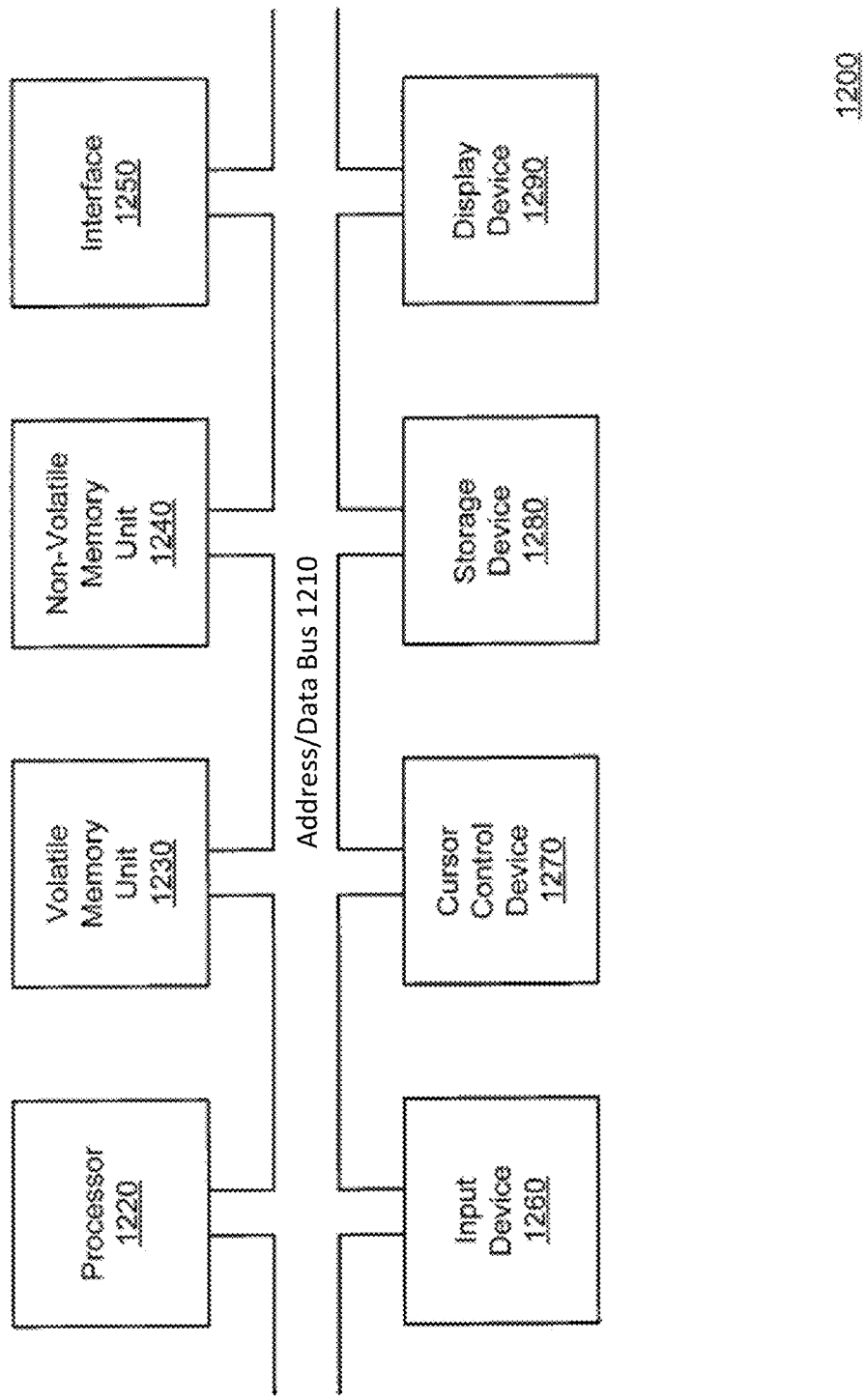
FIG. 21 is a block diagram illustrating a processing system, a processor, or a portion of a processing system or processor used in conjunction with at least one embodiment of the present invention.

In some embodiments of the present invention, the operations shown in the flowchart of FIG. 1 and the blocks shown in the block diagrams of FIGS. 2A and 2B may be implemented by instructions stored in the memory of a computer system, such as a computer described in more detail with respect to FIG. 21.

For a given georeferenced trajectory (e.g., position and attitude), a downhole IMU output generator 10 according to one embodiment of the present invention generates the output of an actual downhole inertial measurement unit (IMU) along that trajectory.

Figure 4:
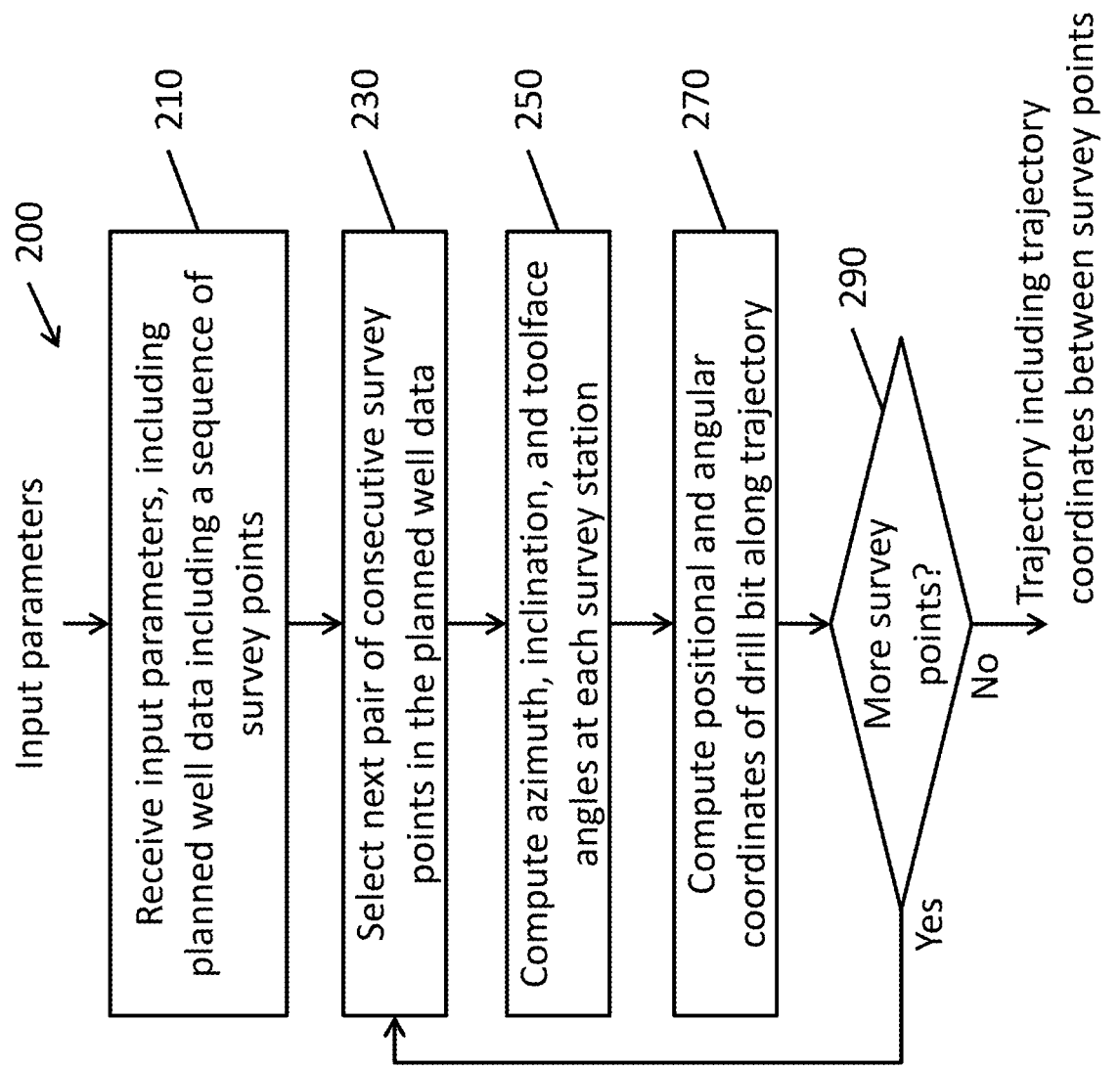
FIG. 4 is a flowchart depicting a method for generating the trajectory according to one embodiment of the present invention.

FIG. 4 is a flowchart depicting a method for generating the trajectory according to one embodiment of the present invention.

The downhole IMU output generator 10 generated IMU outputs in accordance with parameters including: available planned well data 12 (e.g., the desired underground trajectory of the well); geodetic information at the drilling site including but not limited to latitude, longitude, altitude of the BHA head, magnetic reference information, gravity reference information, and earth's rotation rate; and noise characteristics of the outputs of the IMU sensors that are to be generated. In particular, the downhole IMU output generator 10 includes a trajectory generator 20, a sensor output generator 40, and a noise generator 60. The trajectory generator 20 generates the trajectory of the IMU as a function of time (e.g., the location and orientation of the drill bit along the path of the well as a function of time). In some embodiments, the sampling rate or time steps of the generated trajectory is in a range from 1 time step per second to 1000 time steps per second (e.g., 1 Hz to 1000 Hz). The sensor output generator 40 generates the output of the sensor data under the constraints of the trajectory and geodetic information. The noise generator 60 applies noise to the clean sensor data generated by the sensor output generator 40 in accordance with a sensor noise model based on the noise characteristics of the IMU sensors to generate a generated IMU output over the trajectory in accordance with the well plan.

As shown in FIGS. 1, 2A, 2B, and 4 in operation 210, the trajectory generator 20 receives input parameters. In some embodiments, these input parameters include planned well data, geodetic reference parameters, and sensor noise parameters.

In some embodiments, the planned well data 12 includes the planned coordinates of survey points (or survey stations) of the well. Survey points may also be described as way points. This may be represented as, for example, the three columns of data corresponding to the latitude, longitude, and the depth of each survey point. In some embodiments, "north" and "east" positional coordinates may be used instead of latitude and longitude coordinates. The survey points, way points or survey stations correspond to points along the path of the well where the drill bit is stopped (e.g., stationary). In practice, these survey points may be used to measure current position and to insert an additional pipe segment at the top of the well.

Figure 3A:
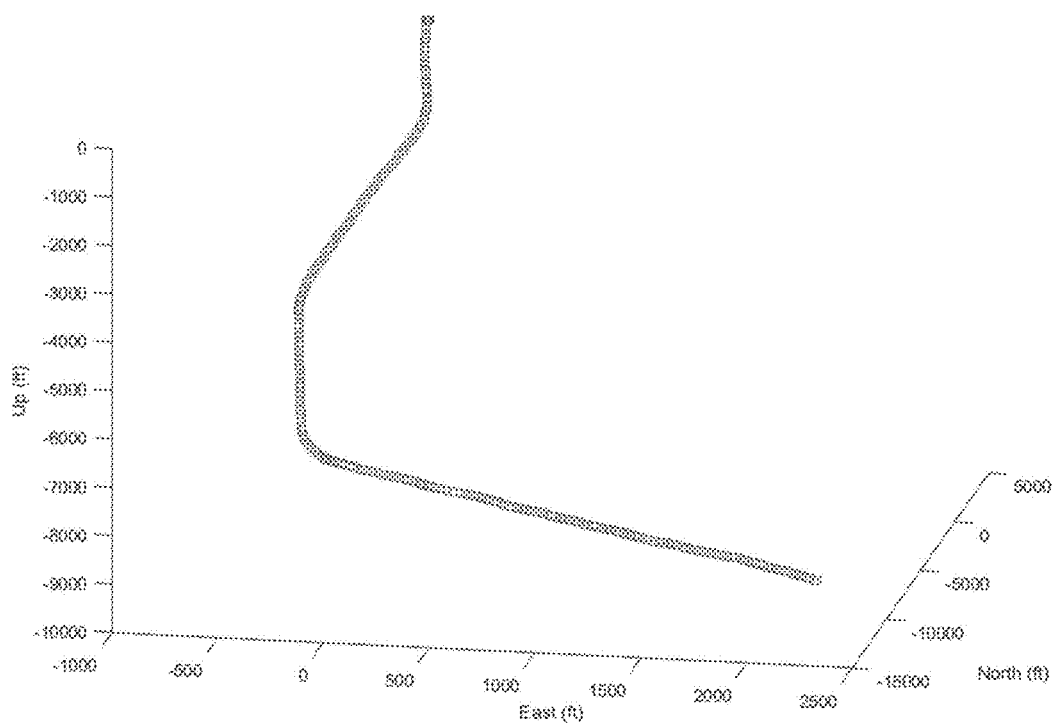
FIG. 3A illustrates the positional coordinates (north, east, and depth or NED coordinates) of survey points of an example plan trajectory
Figure 3B:
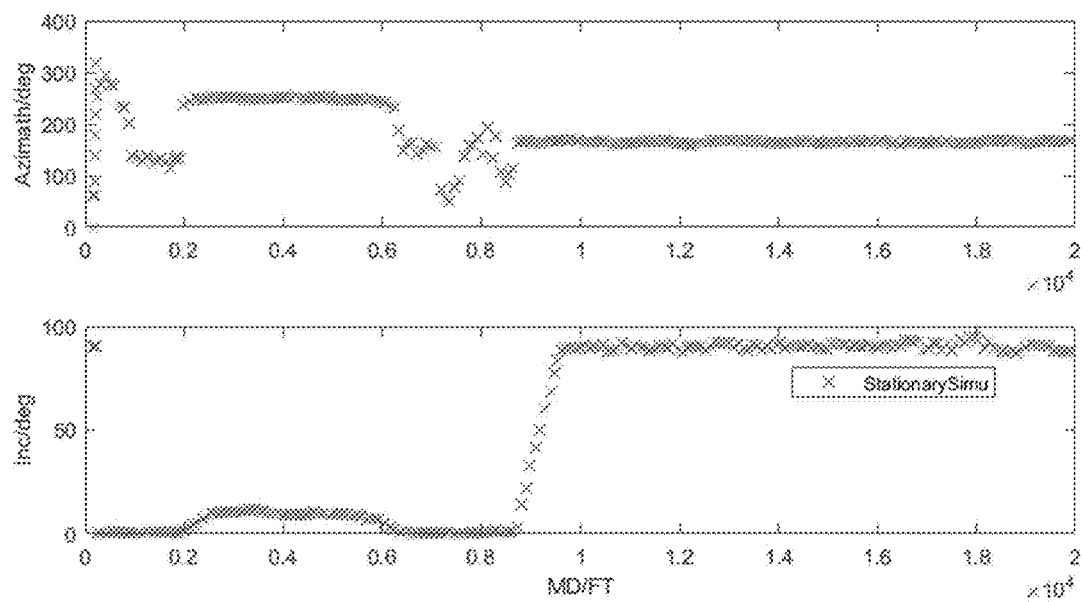
FIG. 3B illustrates the angular coordinates (azimuth and inclination or AI) of the survey points of the example plan trajectory.

FIG. 3A illustrates the positional coordinates (north, east, and depth or NED coordinates) of survey points of an example plan trajectory and FIG. 3B illustrates the angular coordinates (azimuth and inclination or AI) of the survey points of the example plan trajectory. These positional and/or angular coordinates of the survey points make up at least a portion of the planned well data 12 supplied as input to the trajectory generator 100.

In some embodiments, the geodetic reference parameters (e.g., reference data used to convert sensor measurements to a position on the Earth or similar object) include information about the drilling site, including the geomagnetic field strength (Bt) (the Earth's magnetic field), geomagnetic declination (direction of magnetic north resolved to the true north) (Dec), and geomagnetic dip (vertical dip of the Earth's magnetic field vector below horizontal) (Dip), as functions of three-dimensional coordinates. One realization of these geodetic reference parameter functions can be a look-up-table of numerical values of the Bt-Dec-Dip at the proximity of the planned coordinates, which may later be interpolated. The geodetic parameters may also include grid convergence (direction of grid north relative to true north) (Conv).

In some embodiments, the geodetic reference parameters also include the local gravity direction and the rotational rate of the Earth. The values surveyed at the first survey point (typically at the surface of the drilling site) can be used. In some embodiments, a gravity model where the gravity is the function of coordinates can also be used for more realistic generation of results (e.g., where the direction and magnitude of the gravitational force may be modified by massive objects that are local to the drilling site).

In some embodiments, the sensor noise parameters may be based on Allan Deviation (ADEV) analysis or power spectral analysis of IMU sensor noise. These parameters may include, but are not limited to, quantization noise, white noise, bias instability, bias random walk, and bias ramp. In addition, drilling dynamics vibratory noise parameters are also used to generate vibration effects caused by drill head rotation and impact, where the noise characteristics may vary in accordance with the angular speed of the drill.

Referring back to FIGS. 1 and 4, in operation 200, the trajectory generator 20 generates the trajectory of the drill bit as it moves along the between the planned survey points in the planned well data 12. In one embodiment, the trajectory generator 20 is configured to generate six-column trajectory data as a function of time (e.g., in a range from one time step per second to 1000 time steps per second). The six columns of the generated data are the three-dimensional (3-D) coordinates of the drill bit (e.g., in north, east, and depth or NED coordinates) and three angles (e.g., azimuth, inclination, and toolface angles or AIT angles). In some embodiments, the 3-D coordinates refer to the coordinates of the drill-bit in the navigation frame having its origin at the drilling site of on surface; and the three angles refer to Euler angles that are used to determine the rotational matrix from the body frame (on which IMU's X-Y-Z axes are defined) to the navigation frame.

In operation 210, the trajectory generator 20 receives input parameters, including planned well data including a sequence of survey points. In operation 230, the trajectory generator 20 selects the next pair of consecutive survey points in the planned well data, starting with the first pair of survey points.

In operation 250, the trajectory generator 20 computes the azimuth, inclination, and toolface (AIT) angles at the survey points based on the trajectory (e.g., the angles at the survey points shown in FIG. 3B). In the following discussion, the attitude vector or unit attitude vector û(i) represents the heading of the IMU (e.g., the MWD ensemble) as it stops at each survey station i (e.g., the survey stations may be numbered sequentially: i=[1, 2, 3, . . . ]). (The IMU is approximated as being rigidly connected to the drill bit and therefore is assumed to approximate the direction of the drill bit.) Assuming that the initial azimuth and inclination are given (e.g., assuming the initial orientation of the drill bit at the first survey point is known), in one embodiment, the initial unit attitude vector û(i) is calculated as:

$$\hat{u}(i-1) = (sI(i-1) \cdot cA(i-1), sI(i-1) \cdot sA(i-1), cI(i-1))$$

where sI stands for sin(Inclination), cA stands for cos (Azimuth), sI stands for sin(Inclination) and cI stands for cos(Inclination) and the position difference vector $\overrightarrow{AB}$ between the preceding survey station (i−1) and the present survey station i is calculated by:

$$\overrightarrow{AB} = [N(i)-N(i-1), E(i)-E(i-1), D(i)-D(i-1)]$$

The angle subtended by an arc that is a smooth curve tangent to both the preceding and present attitude vectors û(i−1) and û(i) is calculated by:

$$\Theta = 2 \cdot a\cos(\hat{u}(i-1) \cdot \overrightarrow{AB})$$

Accordingly, in one embodiment, the present attitude vector û(i) is calculated by:

$$\hat{u}(i) = 2(\hat{u}(i-1) \cdot \overrightarrow{AB}) \overrightarrow{AB} - \hat{u}(i-1)$$

Note that, if the angle $\Theta$ is very close to zero (e.g., less than a threshold value of $10^{-4}$), then the present attitude vector û(i) is essentially the same as the preceding attitude vector û(i−1).

In one embodiment, this process is iteratively applied, starting from the first survey point, to calculate the unit attitude vector at each survey point in the well plan.

Once the unit attitude vector has been computed for each survey point, the azimuth (A) and inclination (I) angles can be calculated as:

$$A = a\tan 2(\hat{u}(i,2)/\hat{u}(i,1))$$

$$I = a\cos(\hat{u}(i,3))$$

In one embodiment, as a sanity check, if the planned coordinates are based on the convention of grid north, true north, or magnetic north, then the above calculated azimuth A may be calculated based on "map north," and referred to as $A_{map}$, and therefore the true azimuth $A_{true}$ can be adjusted based on the grid convergence (direction of grid north relative to true north) (Conv):

$$A_{true} = A_{map} + \text{Conv}$$

In some embodiments, the toolface angle is not related to the attitude vector of the sensor module which is defined in the local NED frame. This is because the attitude vector is only determined by the inclination and azimuth. However, the toolface angle is used to define the body frame (e.g., the reference frame of the drill bit), because all of the sensors in the IMU refer to the body frame. For the sake of convenience, it is assumed that, during stationary periods of operation (corresponding, for example, to the periods where the drill bit is stationary at the survey points), the toolface will be kept constant as the same value of the preceding time, and the toolface angles are calculated only when in a non-stationary mode (e.g., between survey points).

In operation 270, the trajectory generator 20 generates six column coordinates (e.g., a plurality of six dimensional coordinates) representing the positional and angular coordinates of the drill bit between the survey points. In some embodiments, the duration of time between any two survey points is assumed to be known (e.g., provided as one or more parameters to the trajectory generator 20).

Figure 5:
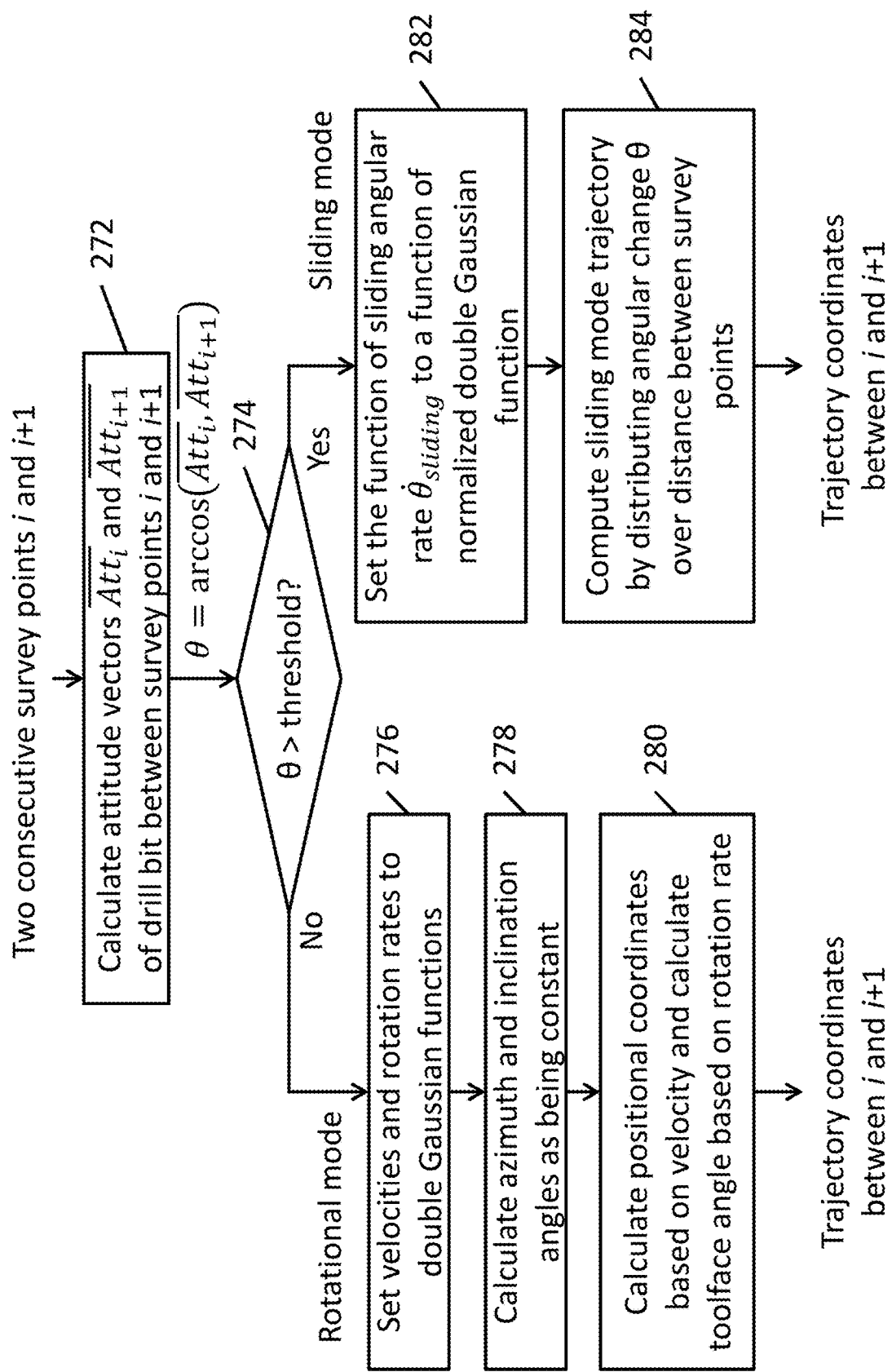
FIG. 5 is a flowchart depicting a method for generating six column trajectory coordinates between two survey points according to one embodiment of the present invention.

FIG. 5 is a flowchart depicting a method for generating six column trajectory coordinates between two survey points according to one embodiment of the present invention.

Referring to FIG. 5, in operation 272, the trajectory generator 20 calculates the attitude vectors ($\overrightarrow{Att_i}$ and $\overrightarrow{Att_{i+1}}$) of the drill bit at the two given survey points (survey points i+1 and i) and their angular difference $\theta$:

$$\overrightarrow{Att_i} = (\sin I_i \cdot \cos A_i, \sin I_i \cdot \sin A_i, \cos I_i)$$

$$\overrightarrow{Att_{i+1}} = (\sin I_{i+1} \cdot \cos A_{i+1}, \sin I_{i+1} \cdot \sin A_{i+1}, \cos I_{i+1}) = \arccos(\overrightarrow{AB} \cdot \overrightarrow{Att_i})$$

In operation 274, the trajectory generator 20 determines the mode between the two survey points. If the angular difference $\theta$ is smaller than a threshold value (e.g., 0.1 degrees), then the mode between the two survey points is classified as being a rotational mode (which refers to a mode where the drill bit moves forward with a substantially straight trajectory, with the drill bit rotating at a particular rotational rate, such as 25 rpm). If the angular difference $\theta$ exceeds the threshold value, then the mode between the two survey points is classified as a sliding mode (which refers to a mode where the drill bit moves with a curved trajectory, and where the drill bit does not rotate).

If the mode between the two survey points is a rotational mode, then, in operation 276, the trajectory generator 20 sets the functions of velocities $\vec{V}_{rotational}(t)$ and rotation rates $\omega_{rotational}(t)$ as following normalized double-Gaussian function distributions $f_{Gaussian}(t)$:

$$f_{Gaussian}(t) = \frac{1/2}{\sqrt{2\pi}\,\sigma_1} \exp\left(-\frac{(t-t_1)^2}{2\sigma_1^2}\right) + \frac{1/2}{\sqrt{2\pi}\,\sigma_2} \exp\left(-\frac{(t-t_2)^2}{2\sigma_2^2}\right)$$

$$\vec{V}_{rotational}(t) = (\vec{P}_1 \cdot \vec{P}_2) \cdot f_{Gaussian}(t)$$

$$\omega_{rotational}(t) = RR \cdot f_{Gaussian}(t)$$

In the above equations, $t_1$ and $t_2$ and $\sigma_1$ and $\sigma_2$ are the centers and the durations of the first and second Gaussian functions, respectively, from the above definition of $f_{Gaussian}(t)$ Based on the defined moving time ($\Delta t$) in between the survey points, in one embodiment, the values of the parameters ae set to satisfy $\sigma_{1,2} < 0.2\Delta t$ (more explicitly, $\sigma_1 < 0.2\Delta t$ and $\sigma_2 < 0.2\Delta t$), and $|\sigma_{1,2} \pm t_{1,2}| < 0.3\Delta t$ (more explicitly, $|\sigma_1 \pm t_1| < 0.3\Delta t$ and $|\sigma_2 \pm t_2| < 0.3\Delta t$); $\vec{P}_i$ and $\vec{P}_{i+1}$ are the NED coordinates of the first and second survey points; $\Delta t$ is the time duration between two the survey points; and $\theta$ is the angular difference calculated for calculating $\theta$ in operation 274.

In the case where mode between the two survey points is a rotational mode, then in operation 278, the A and I coordinates are calculated as being the same during the moving time, because the angular change of the unit attitude vector is smaller than the threshold (e.g., a threshold such as 0.1 degrees). In one embodiment, in operation 280 the NED coordinates $\vec{P}$ at each sampling time t is calculated as:

$$\vec{P}(t) = \vec{P}_i + \int_0^t \vec{\nabla}_{rotational}(t)dt$$

and the toolface angle T at each sampling time t is calculated as:

$$T(t) = \mathrm{mod}(\int_0^t \omega_{rotational}(t)dt\ T(0), 360$$

where mod is the modulus after division function (e.g., in order to constrain the toolface angle T to the range [0, 360)), and T(0) refers to the toolface angle at the beginning of this particular motion, e.g., the toolface angle when the drill bit begins its motion, starting at survey point i.

Figures 6A, 6B:
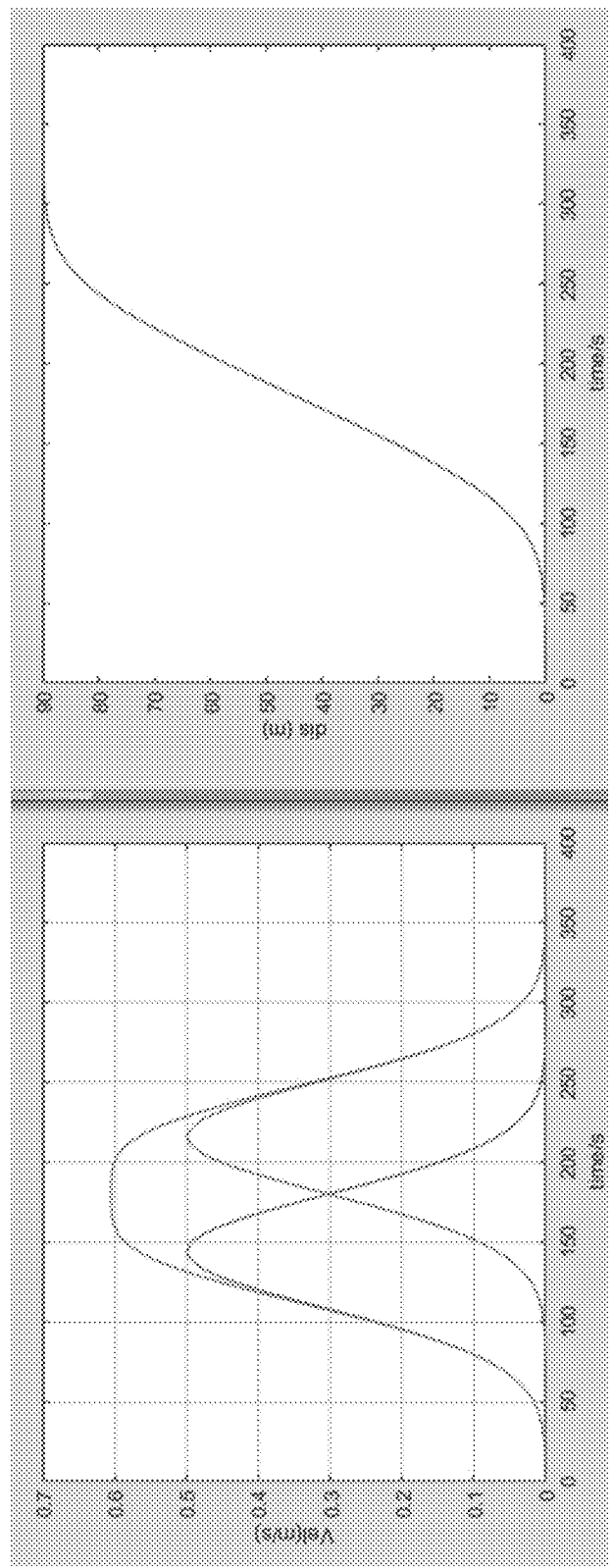
FIG. 6A is a graph depicting the realization of the velocities as a function of time in a rotational drilling mode with a normalized double-Gaussian distribution function.
FIG. 6B is a graph of the distance traveled as a function of time.

FIG. 6A is a graph depicting the realization of the velocities as a function of time in a rotational drilling mode with a normalized double-Gaussian distribution function, and FIG. 6B is a graph of the distance traveled as a function of time in a rotational mode. Accordingly, each of the trajectory coordinates can be considered as being associated with a timestamp.

If the mode between the two survey points is a sliding mode, then, in operation 282, the trajectory generator 20 sets the function of the sliding angular rate $\dot{\theta}_{sliding}$ to a function of the normalized double Gaussian function distribution:

$$\dot{\theta}_{sliding} = \theta \cdot f_{Gaussian}(t)$$

In operation 284, the trajectory generator 20 computes the sliding mode trajectory of the curvature between the two given survey points as N points along an arc, where the angle away from the first station is given by $jd\theta$, where $j = 1, 2, \ldots N$ and with $d\theta = \theta/N$. Accordingly, the coordinates of these points can be given by:

$$\vec{P}(t) = \vec{P}_i + \frac{R\left(\cos\left(\int_0^t \dot{\theta}(t)dt\right) - 1\right)}{\sin(\theta)} \left(\overrightarrow{Att_i}\cos(\theta) - \overrightarrow{Att_{i+1}}\right) + R\overrightarrow{Att_i}\sin\left(\left(\int_0^t \dot{\theta}(t)dt\right)\right)$$

where R is the radius of the curvature, which can be calculated as:

$$R = \frac{|\vec{P}_i - \vec{P}_{i+1}|}{2\sin\left(\frac{\theta}{2}\right)}$$

The attitude at each time t is related to the its NED coordinate $\vec{P}$ (t) as:

$$\overrightarrow{Att}(t) = \frac{\vec{P}(t) - \vec{P}_i}{R \cdot \tan\left(\frac{\theta}{2}\right)} - \overrightarrow{Att_i}$$

Accordingly, in one embodiment, the AI coordinates are computed as:

$$[A(t), I(t)] = \left[\mathrm{atan}\left(\frac{Att(i, 2)}{Att(i, 1)}\right), \mathrm{acos}(Att(i, 3))\right]$$

where $\overrightarrow{AB}(t) \equiv [Att(i, 1), Att(i, 2), Att(i, 3)] = [sI*cA, sI*sA, cI]$. The toolface angle T is not calculated because the toolface angle is kept the same during the sliding mode.

Systems and methods for computing trajectory coordinates in sliding mode are described in more detail in U.S. Provisional Patent Application No. 62/233,936, "Real-Time Trajectory Estimation with Multi-Station Analysis," filed in the United States Patent and Trademark Office on Sep. 28, 2015 and U.S. Patent Publication No. 2017/0314384, "Real-Time Trajectory Estimation with Multi-Station Analysis," filed in the United States Patent and Trademark Office on Sep. 28, 2016 and published on Nov. 2, 2017, the entire disclosures of which are incorporated by reference herein.

Figures 7A, 7B:
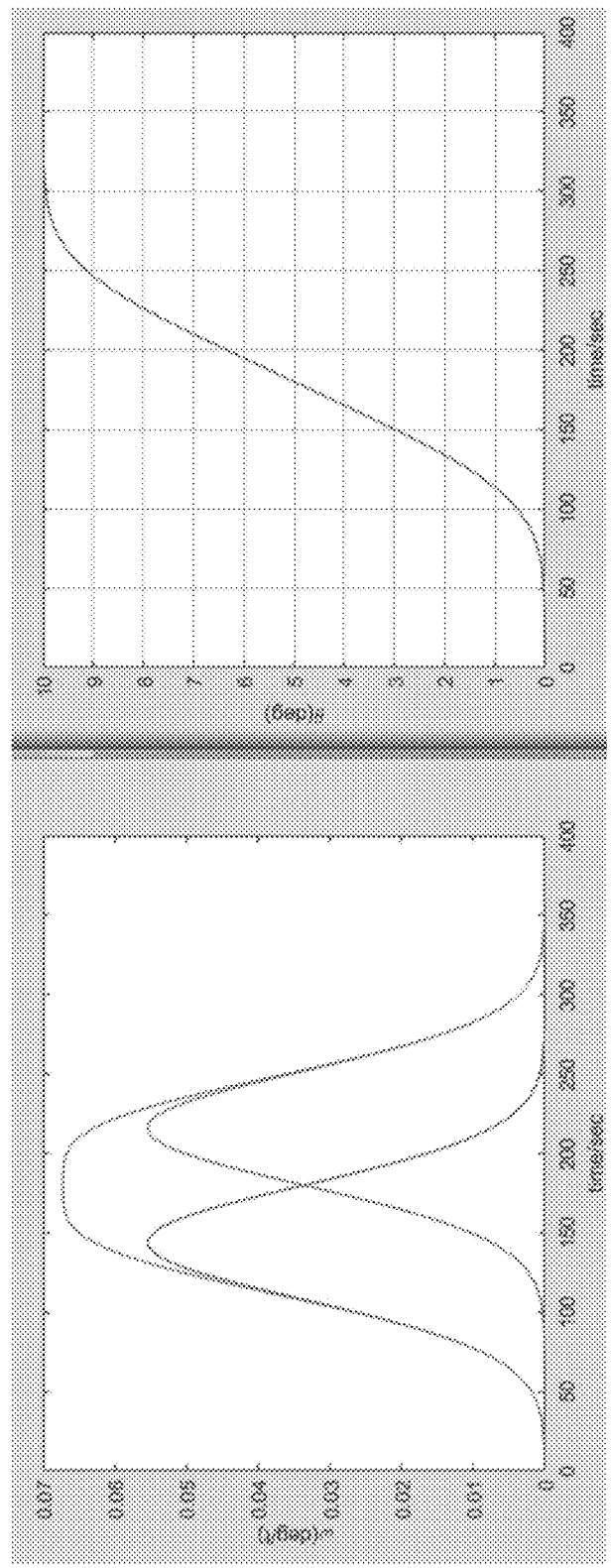
FIG. 7A is a graph depicting the realization of the angular rates as a function of time in a rotational drilling mode with a normalized double-Gaussian distribution function.
FIG. 7B is a graph of the angular difference between the attitude at a first station and the attitude at a second station as a function of time.

FIG. 7A is a graph depicting the realization of the angular rates as a function of time in a rotational drilling mode with a normalized double-Gaussian distribution function. FIG. 7B is a graph of the angular difference between the attitude at a first station and the attitude at a second station as a function of time. Accordingly, each of the trajectory coordinates can be considered as being associated with a timestamp.

Referring back to FIG. 4, in operation 290, the trajectory generator 20 determines if there are more consecutive pairs of survey points to consider. If so, then the process of computing coordinates between consecutive pairs of survey points continues by selecting the next pair of survey points in operation 230 until the trajectory generator 20 has generated a plurality of trajectory coordinates between each pair of consecutive survey points.

FIG. 8A is a graph depicting azimuth, inclination, and toolface (AIT) coordinates as a function of time, as generated according to one embodiment of the present invention. FIG. 8B is an enlargement of the portion of FIG. 8A indicated with an ellipse. Accordingly, each of the trajectory coordinates can be considered as being associated with a timestamp.

Figure 9A:
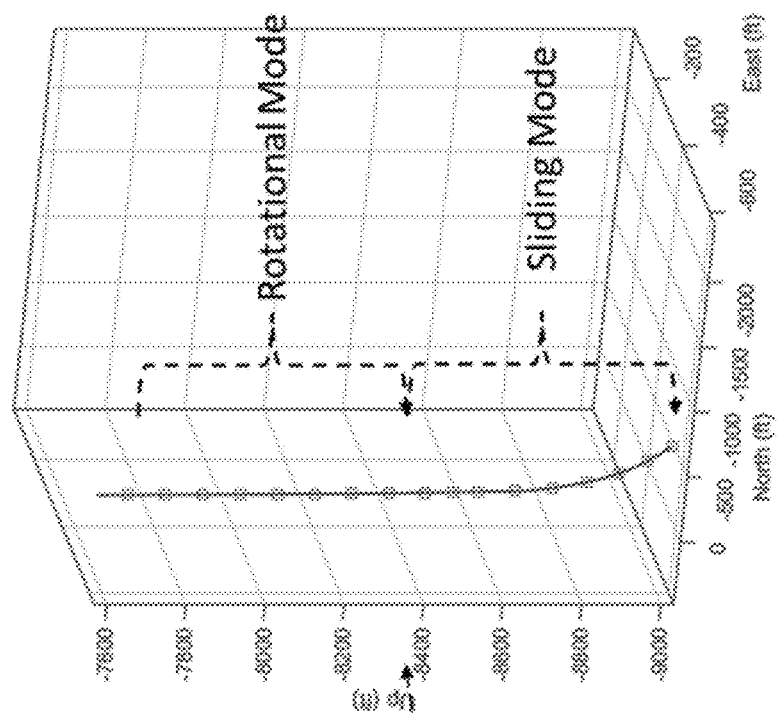
FIG. 9A is a three-dimensional graph showing the generated positional coordinates (north, east, and depth or NED coordinates) of a generated trajectory according to one embodiment of the present invention.
Figure 9B:
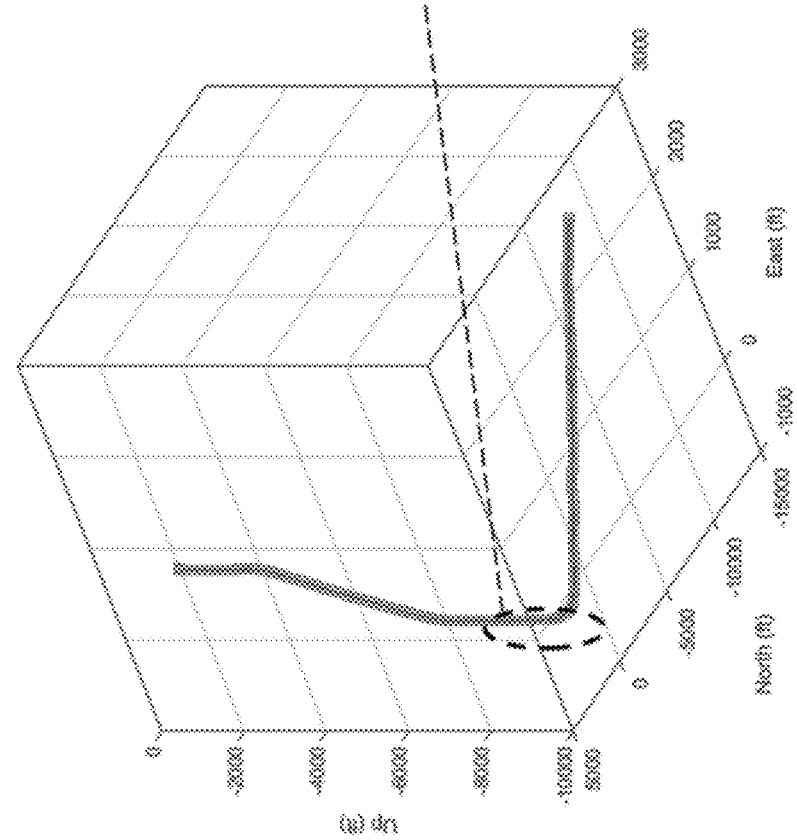
FIG. 9B is an enlargement of the portion of FIG. 9A indicated with an ellipse.

FIG. 9A is a three-dimensional graph showing the generated positional coordinates (north, east, and depth or NED coordinates) of a generated trajectory according to one embodiment of the present invention, and FIG. 9B is an enlargement of the portion of FIG. 9A indicated with an ellipse.

In some embodiments of the present invention, a "sanity check" computation is performed on the generated attitude (AIT) coordinates to ensure that they are reasonable and/or well-defined. The angular coordinates would be ill-defined if the inclination (I) coordinate satisfied the relationship $\sin(I) \approx 0$, because, in any attitude that is pointing straight down or straight up, the azimuth (A) angle becomes ill-defined.

Accordingly, in one embodiment of the present invention, the generated attitude coordinates A(t) are checked to determine if there is any period of time in which $\sin(I) \approx 0$. If there is such a duration $\Delta t$, then the azimuth within this period of time is defined as a continuous function of time connecting the azimuth at the beginning and the azimuth at the end. Examples of appropriate continuous functions according to various embodiments of the present invention include a linear function, a polynomial function, and a triangle function. For example, in one embodiment, the azimuth during such a period of time $\Delta t$ is given as:

$$A(t) = A_0 + (A_1 - A_0) \cdot \sin\left(\frac{\pi t}{2\Delta t}\right)$$

where $A_0$ is the azimuth at the beginning of the duration $\Delta t$, and $A_1$ is the azimuth at the end of the duration $\Delta t$.

Figure 10:
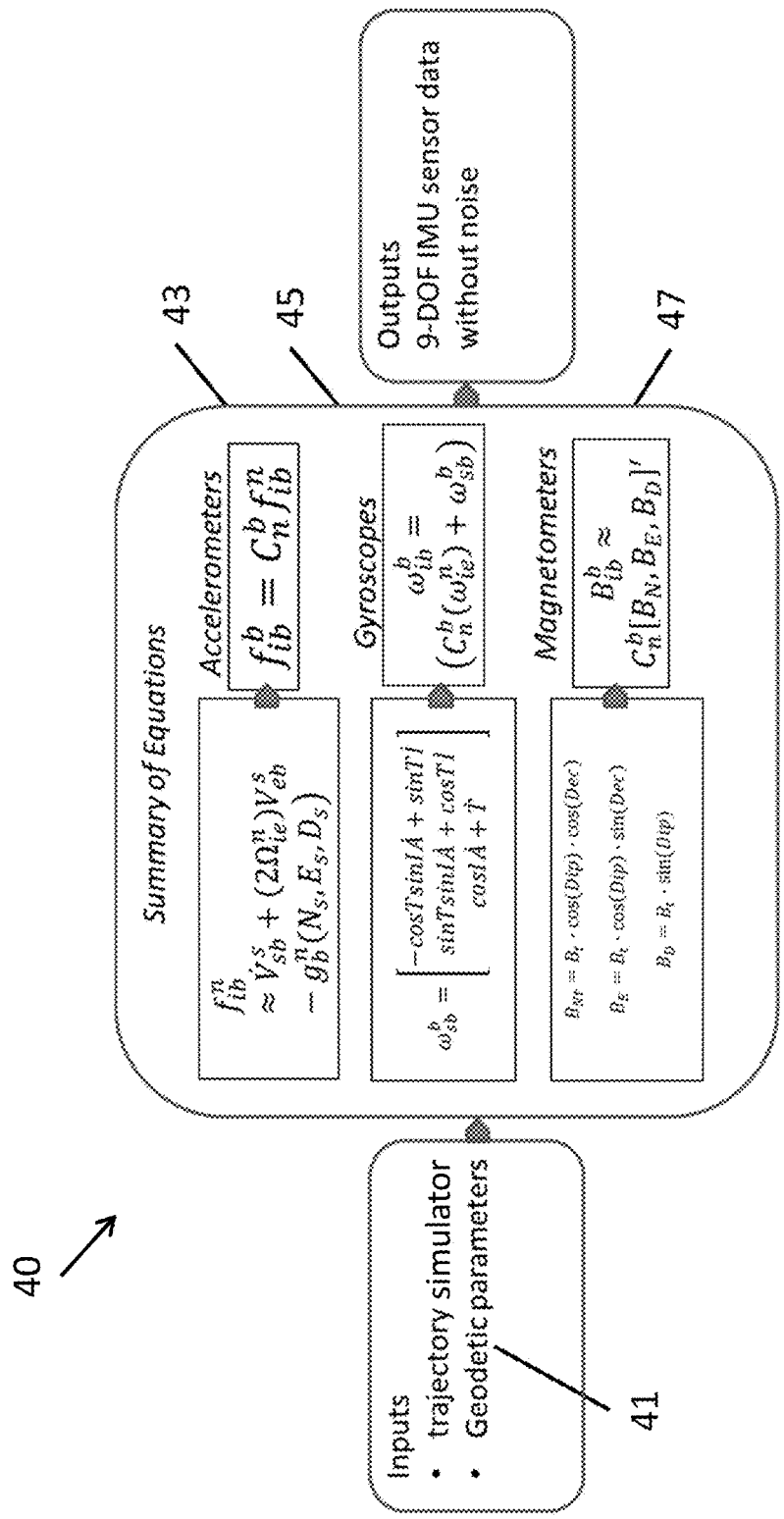
FIG. 10 is a functional block diagram illustrating components of an IMU output generator according to one embodiment of the present invention.

FIG. 10 is a functional block diagram illustrating components of a sensor output generator 40 according to one embodiment of the present invention. As shown in FIG. 10, the sensor output generator 300 includes an input module that is provided with the generated trajectory from the trajectory generator 20 along with the geodetic parameters 41. In some embodiments, the geodetic parameters 41 include magnetic strength (Bt) and the dip and declination angles, as described above.

The generated trajectory and the geodetic parameters are used to generate the outputs of accelerometers 43, gyroscopes 45, and magnetometers 47 to generate nine-degree-of-freedom (9-DOF) sensor data. This generated sensor data does not include noise, and merely represents an idealized output from the sensor output generators.

In more detail, the output generators 43 generate three axis data at the navigation frame $f_{ib}^n$, as illustrated in FIG. 10. The three axis data at the navigation frame $f_{ib}^n$ can be generated in accordance with the following equation:

$$f_{ib}^n \approx \dot{V}_{sb}^s + (2\Omega_{ie}^n) V_{eb}^s - g_b^n(N_s, E_s, D_s)$$

Figures 11A, 11B, 11C:
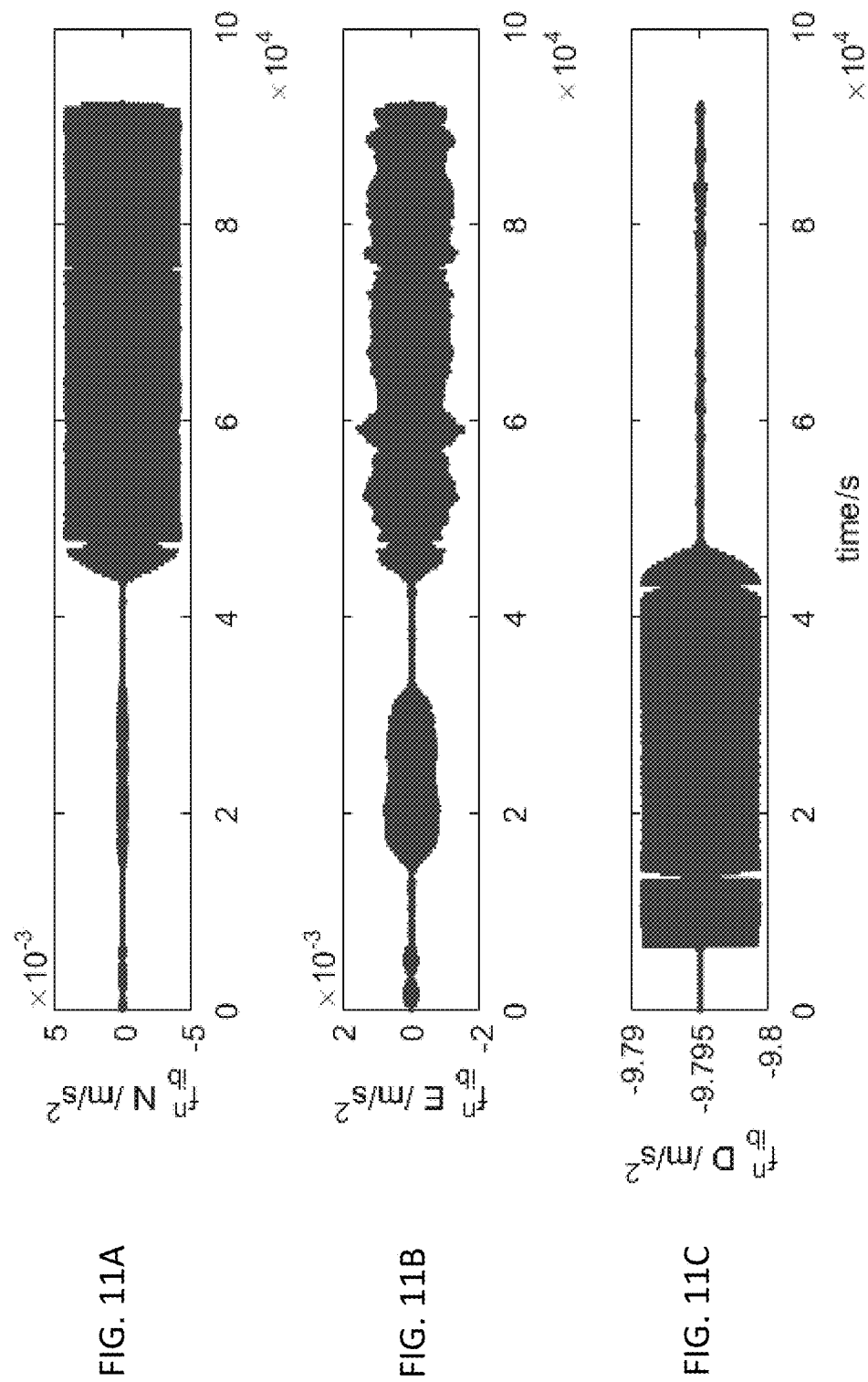
FIGS. 11A, 11B, and 11C are graphs depicting acceleration vectors, with respect to the navigation frame, generated by an IMU output generator according to one embodiment of the present invention.

FIGS. 11A, 11B, and 11C are graphs depicting acceleration vectors, with respect to the navigation frame, generated by a sensor output generator 40 according to one embodiment of the present invention.

The outputs of the generated three axis accelerometer data in the navigation frame $f_{ib}^n$ can then be converted to the body frame $f_{ib}^b$ in accordance with the relationship:

$$f_{ib}^b = C_n^b f_{ib}^n$$

where $C_n^b$ is the transformation matrix that represents the relationship between body frame and the navigation frame, where $$C_b^n = C_n^{b'} = \begin{bmatrix} cAcIcT - sAsT & -cAcIsT - sAcT & cAsI \\ sAcIcT + cAsT & cAcT - sAcIsT & sAsI \\ -sIcT & sIsT & cI \end{bmatrix}$$

and where the prime (') represents the transpose.

Figures 12A, 12B, 12C:
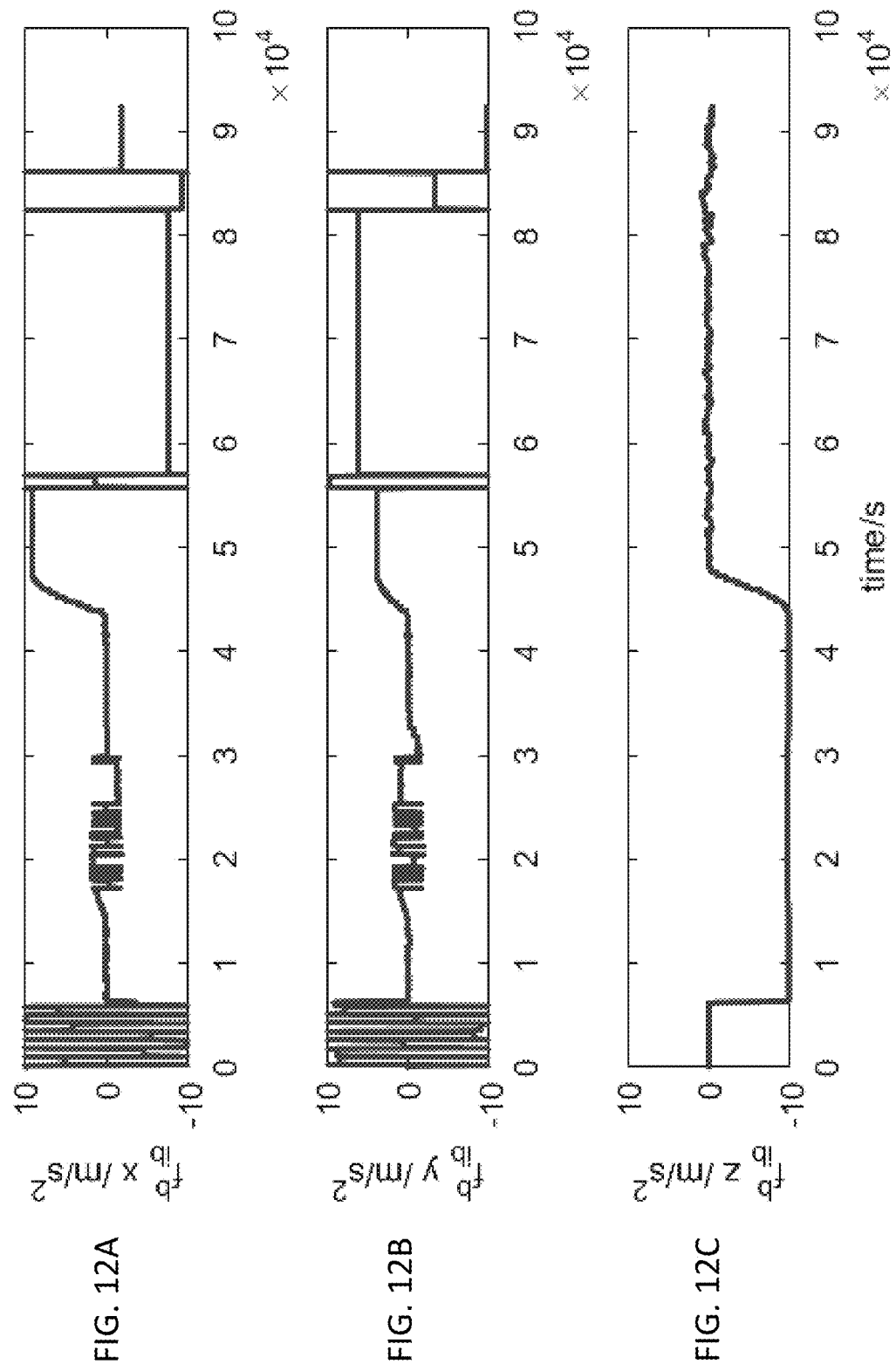
FIGS. 12A, 12B, and 12C are graphs depicting 3-axis accelerometer data generated by an IMU output generator, with respect to the body frame, without added noise, according to one embodiment of the present invention.

FIGS. 12A, 12B, and 12C are graphs depicting 3-axis accelerometer data generated by a sensor output generator 40, with respect to the body frame, without added noise, according to one embodiment of the present invention.

The generated gyroscopes 45 generate three axis outputs in the navigation frame $\omega_{sb}^b$ in accordance with the relationship:

$$\omega_{sb}^b = \begin{bmatrix} (-\cos(T)\sin(I)) * \dot{A} + \sin(T) * \dot{i} \\ (\sin(T)\sin(I)) * \dot{A} + \cos(T) * \dot{i} \\ \cos(I) * \dot{A} + \dot{T} \end{bmatrix}$$

Figure 13A:
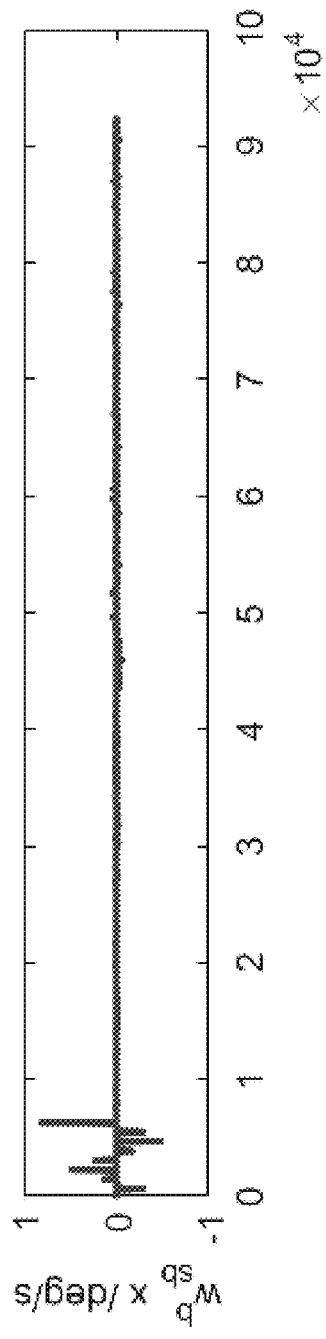
FIGS. 13A, 13B, and 13C are graphs depicting angular rate vectors due to changes in attitude corresponding to the desired trajectory expressed in the body frame, generated by an IMU output generator according to one embodiment of the present invention.
Figure 13B:
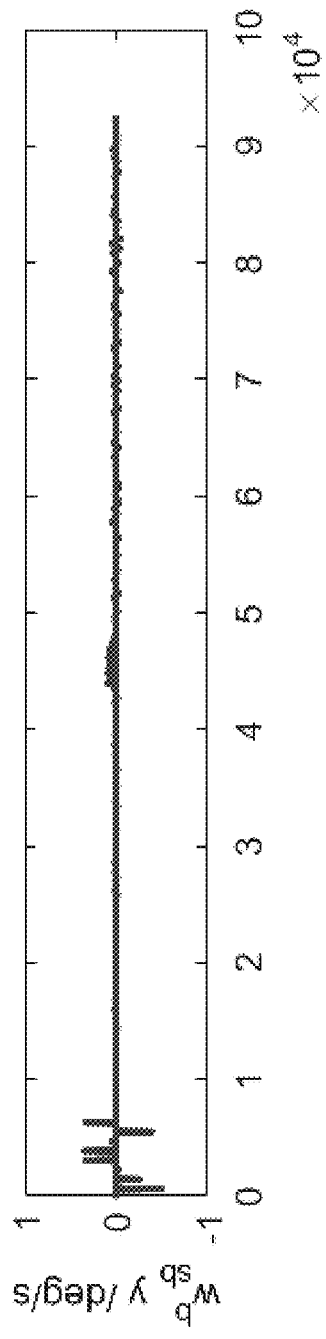
Figure 13C:
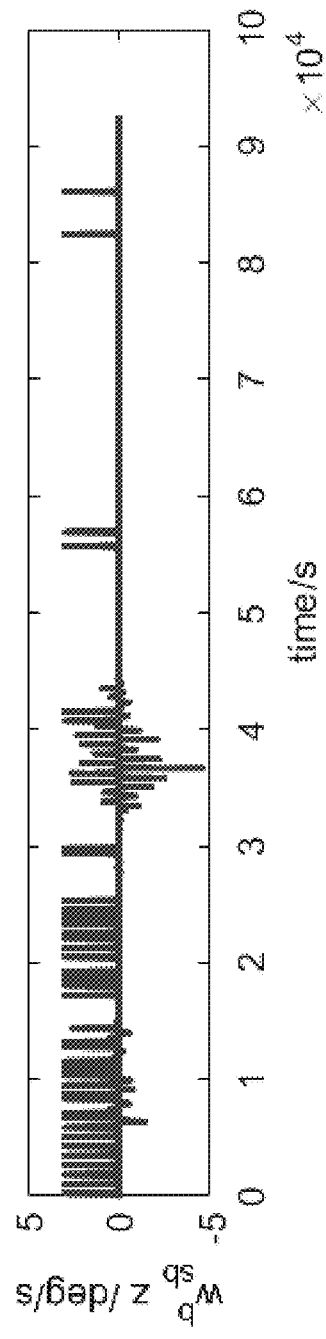

FIGS. 13A, 13B, and 13C are graphs depicting angular rate vectors, with respect to the navigation frame $\omega_{sb}^b$, generated by an IMU generator according to one embodiment of the present invention.

The outputs of the generated three axis gyroscopic data with respect to the navigation frame $\omega_{sb}^b$ can then be converted to be with respect to the inertial frame $\omega_{ib}^b$ in accordance with the relationship:

$$\omega_{ib}^b = C_n^b(\omega_{ie}^n) + \omega_{sb}^b$$

Figure 14A:
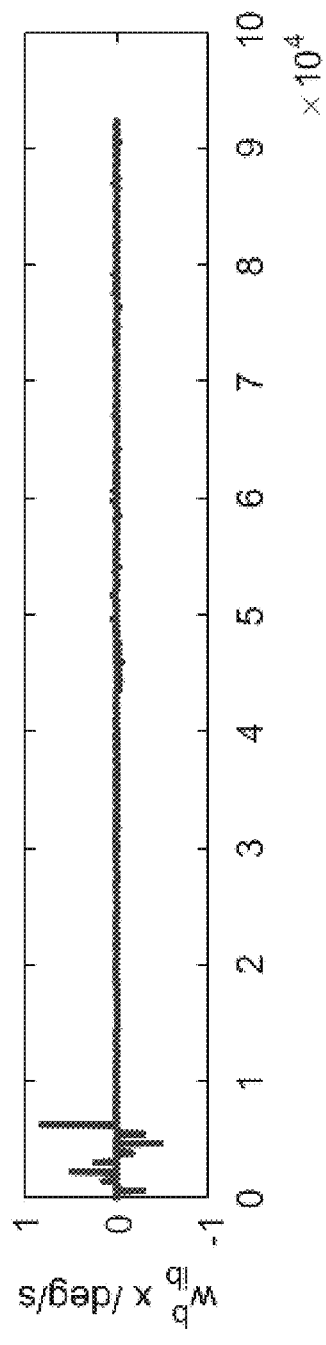
FIGS. 14A, 14B, and 14C are graphs depicting 3-axis gyroscopic data generated by an IMU output generator, with respect to the body frame including the rotation of the Earth in addition to rotations due to attitude changes corresponding to the desired trajectory, without added noise, according to one embodiment of the present invention.
Figure 14B:
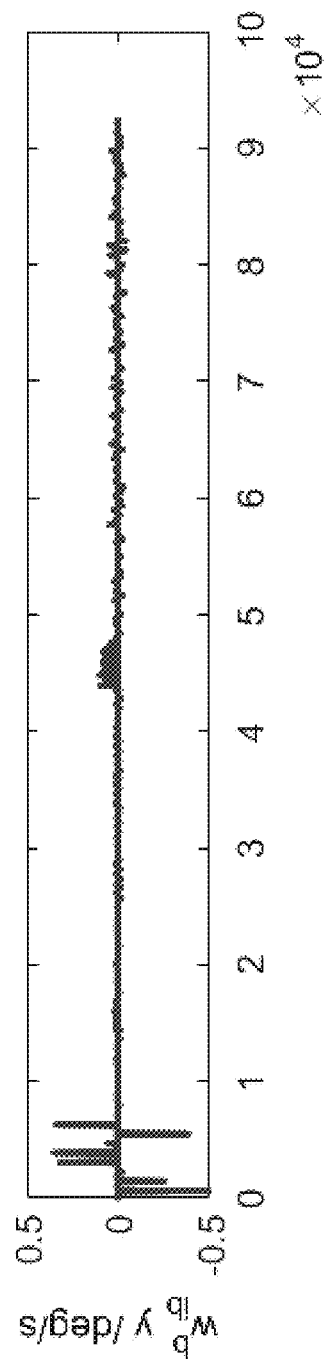
Figure 14C:
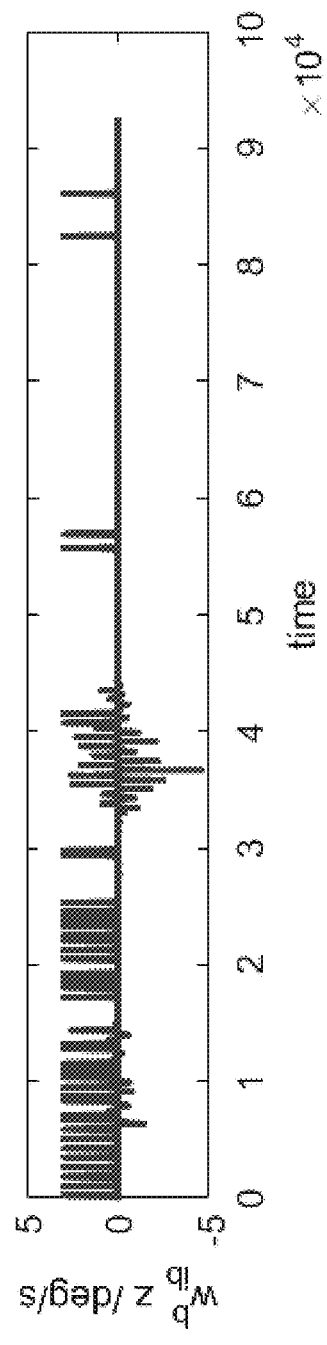

FIGS. 14A, 14B, and 14C are graphs depicting 3-axis gyroscopic data generated by a sensor output generator 40, with respect to the inertial frame $\omega_{ib}^b$, without added noise, according to one embodiment of the present invention.

According to one embodiment, the generated magnetometer 47 generates three axis magnetometer data in the navigation frame along the positional directions north, east, and depth (N, E, and D) based on the given geodetic parameters 41:

$$B_N = B_t \cdot \cos(Dip) \cdot \cos(Dec)$$

$$B_E = B_t \cdot \cos(Dip) \cdot \sin(Dec)$$

$$B_D = B_t \cdot \sin(Dip)$$

The outputs of the generated three axis magnetometer data can then be converted to the body frame $B_{ib}^b$ in accordance with the relationship:

$$B_{ib}^b \approx C_n^b [B_N, B_E, B_D]$$

Figures 15A, 15B, 15C:
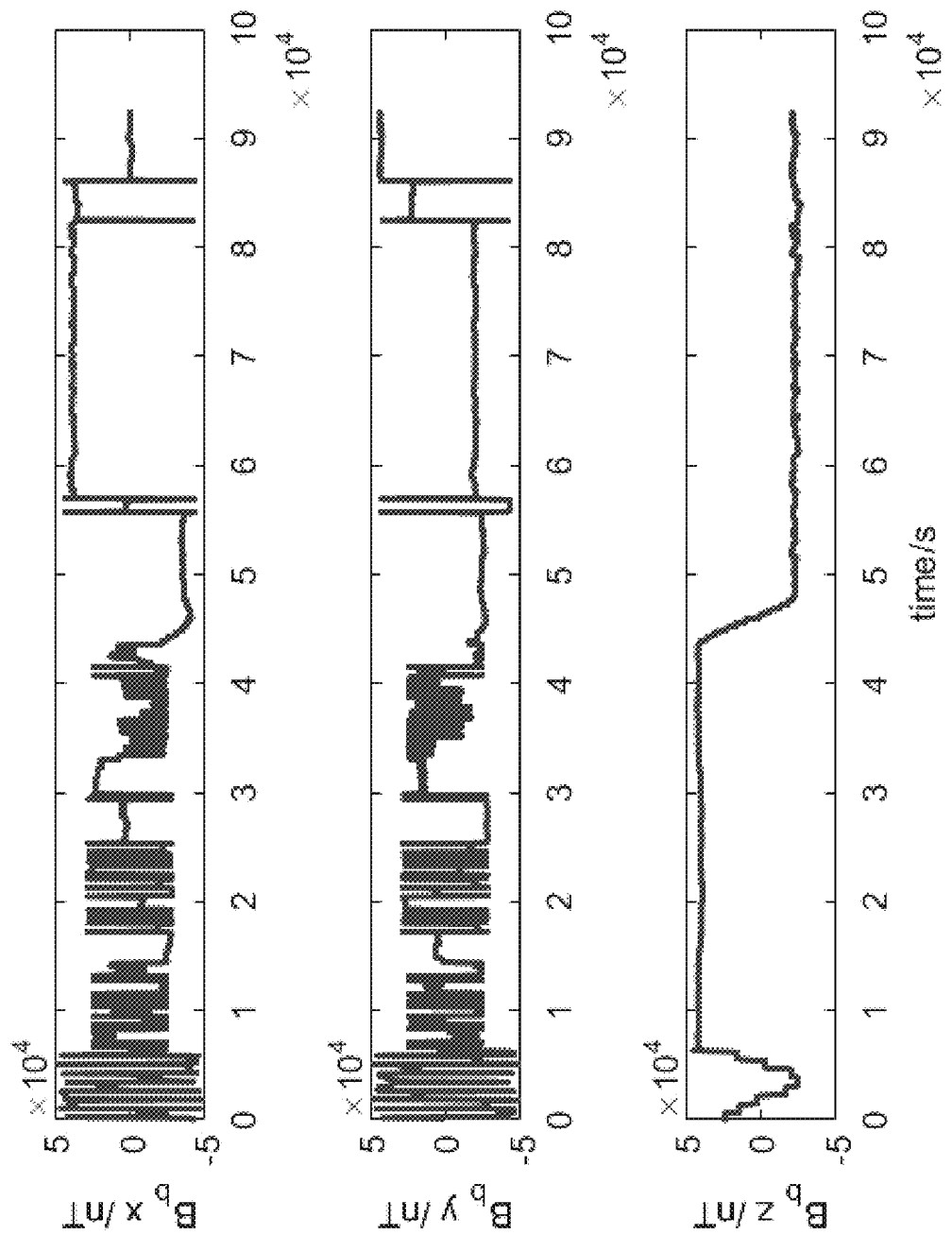
FIGS. 15A, 15B, and 15C are graphs depicting 3-axis magnetometer data generated by an IMU output generator, without added noise, according to one embodiment of the present invention.

FIGS. 15A, 15B, and 15C are graphs depicting 3-axis magnetometer data generated by a sensor output generator 40, in the body frame without added noise, according to one embodiment of the present invention.

In one embodiment of the present invention, the generated IMU data is verified by comparing the calculated positional coordinates from the trajectory generator 20 with the output of an inertial navigation system (INS) that is supplied with the generated IMU data. One example of an INS model is described in Paul D. Groves, *Principles of GNSS, Inertial and Multisensor Integrated Navigation Systems*, Artech House (2001), the entire disclosure of which is incorporated by reference herein.

Figure 16A:
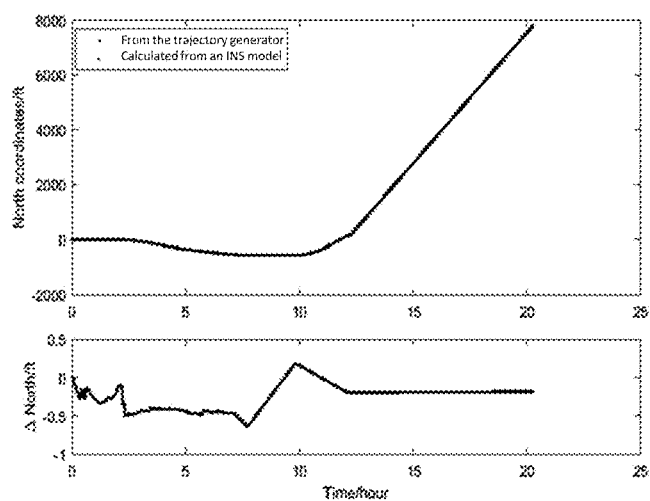
FIGS. 16A, 16B, and 16C are graphs depicting the coordinates from the trajectory generator and from the inertial navigation system as well as differences between the north, east, and depth positions between the trajectory generator and the output of an inertial navigation system (INS) that is supplied with generated IMU sensor data according to one embodiment of the present invention.
Figure 16B:
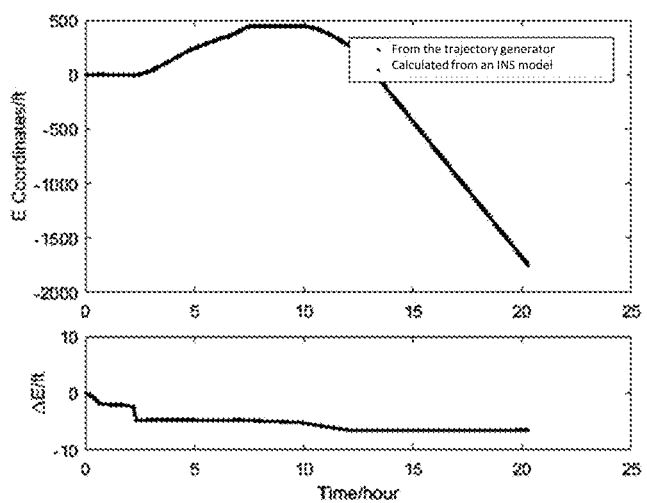
Figure 16C:
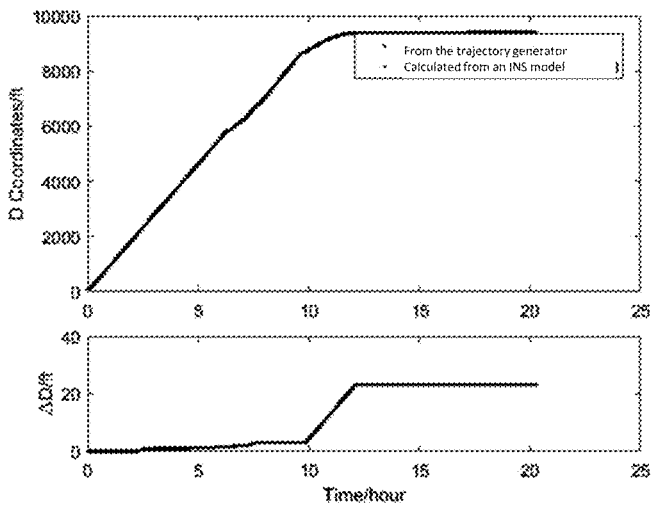

FIGS. 16A, 16B, and 16C are graphs depicting differences between the north, east, and depth positional differences between the trajectory generator and the output of an inertial navigation system (INS) that is supplied with generated IMU sensor data according to one embodiment of the present invention. As shown in FIGS. 16A, 16B, and 16C, there is a less than 20 foot error at the end of the generated thousands of feet of drilling over a generated 20 hours.

As noted above, the outputs of the sensor output generator 40 generated accelerometer, gyroscope, and magnetometer data that is free of noise. However, sensor data from real inertial measurement units contain noise. Therefore, one aspect of embodiments of the present invention relates to a noise generator module 60 configured to add noise to the generated IMU data in accordance with noise models for the various sensors of the IMU.

Generally, two types of noise can be observed in the output from the IMU of a real drilling apparatus: sensor noise; and drilling noise due to drilling dynamics (e.g., linear and torsional vibration, shock, temperature swings and temperature gradients). In survey mode, when all drilling activity is halted (e.g., when the drill bit is stationary at the survey points), only sensor noise is present, whereas during any type of drilling, vibratory noise is also present. The noise profile added to the synthesized IMU signal is shaped by characterization parameters determined from measurements, allowing the sensor output generator 40 to produce, with the noise generator module 60, realistic IMU signals.

An inertial sensor's output contains a multitude of noise components which affect the accuracy of measurements. Various analysis methods exist to identify and characterize these noise components, such as Power Spectral Density and Allan Deviation analysis (see, e.g., Allan, D. W., "Statistics of atomic frequency standards," Proceedings of the IEEE, vol. 54, no. 2, pp. 221-230, February 1966.). For the sake of illustration, the below discussion will make use of Allan Deviation analysis, but embodiments of the present invention are not limited thereto.

Figure 17:
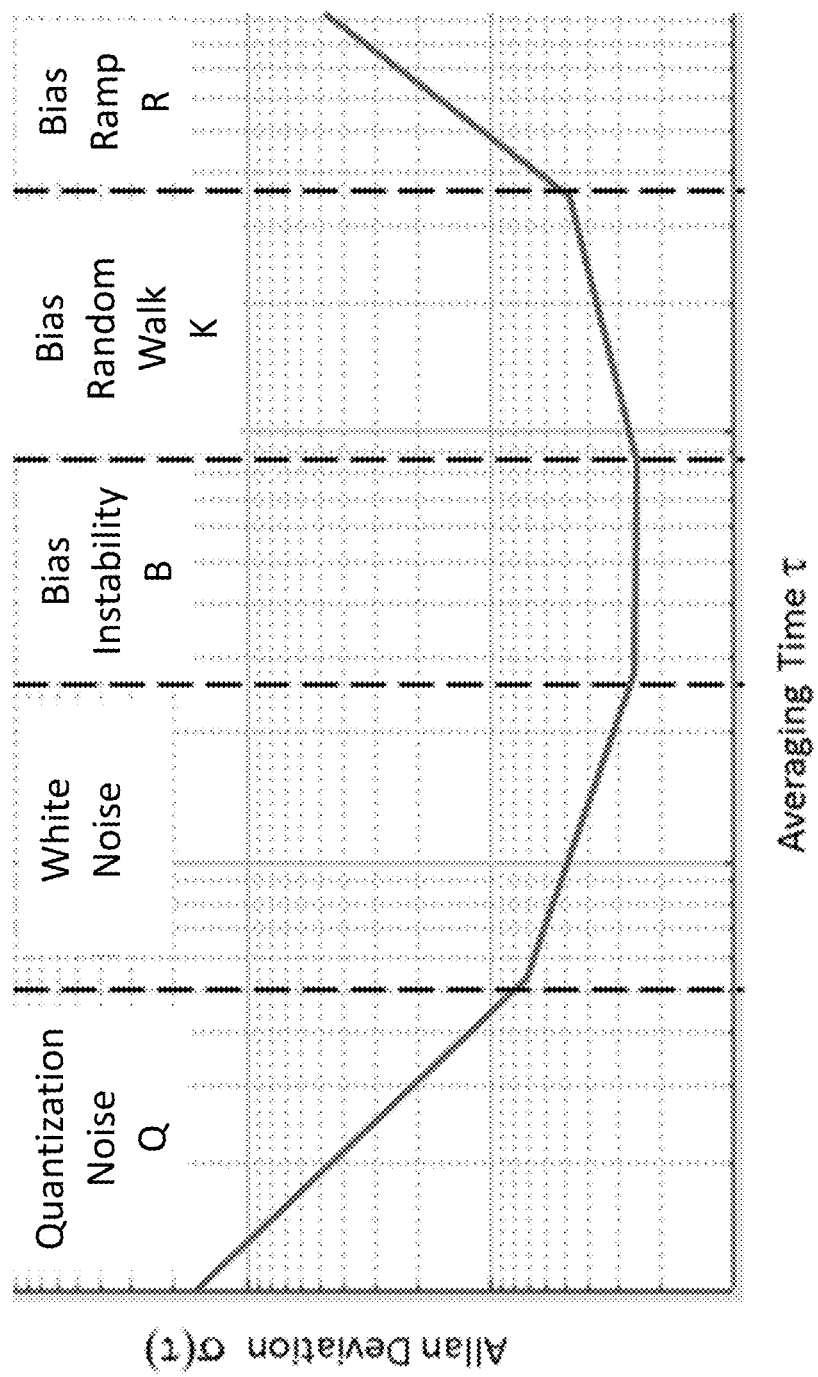
FIG. 17 is an Allan deviation curve characterizing the different components of noise in a sensor output.

Allan deviation analysis is performed on the output of a sensor under static conditions, producing a curve of Allan Deviation versus averaging time, as shown in FIG. 17, which is an Allan deviation curve characterizing the different components of noise in a sensor output. Different types of noise are identified based on the slope at different sections of the curve and noise coefficients, including quantization noise (Q), white noise (N), bias instability (B), bias random walk (K), and bias ramp (R) are derived according to El-Sheimy, Naser, Haiying Hou, and Xiaoji Niu. "Analysis and modeling of inertial sensors using Allan variance." IEEE Transactions on Instrumentation and Measurement 57.1 (2008): 140-149. These coefficients are then used to generate the individual noise components which are summed to produce a composite noise signal that is added to the clean sensor signal in the generator, as shown in FIG. 18.

When the drill bit is operating, the IMU is subject to e.g. mechanical vibrations which are picked up by its sensors. To generate this type of noise, real field data is processed to compute the typical noise spectrum for each drilling mode (rotating and sliding).

Figure 18:
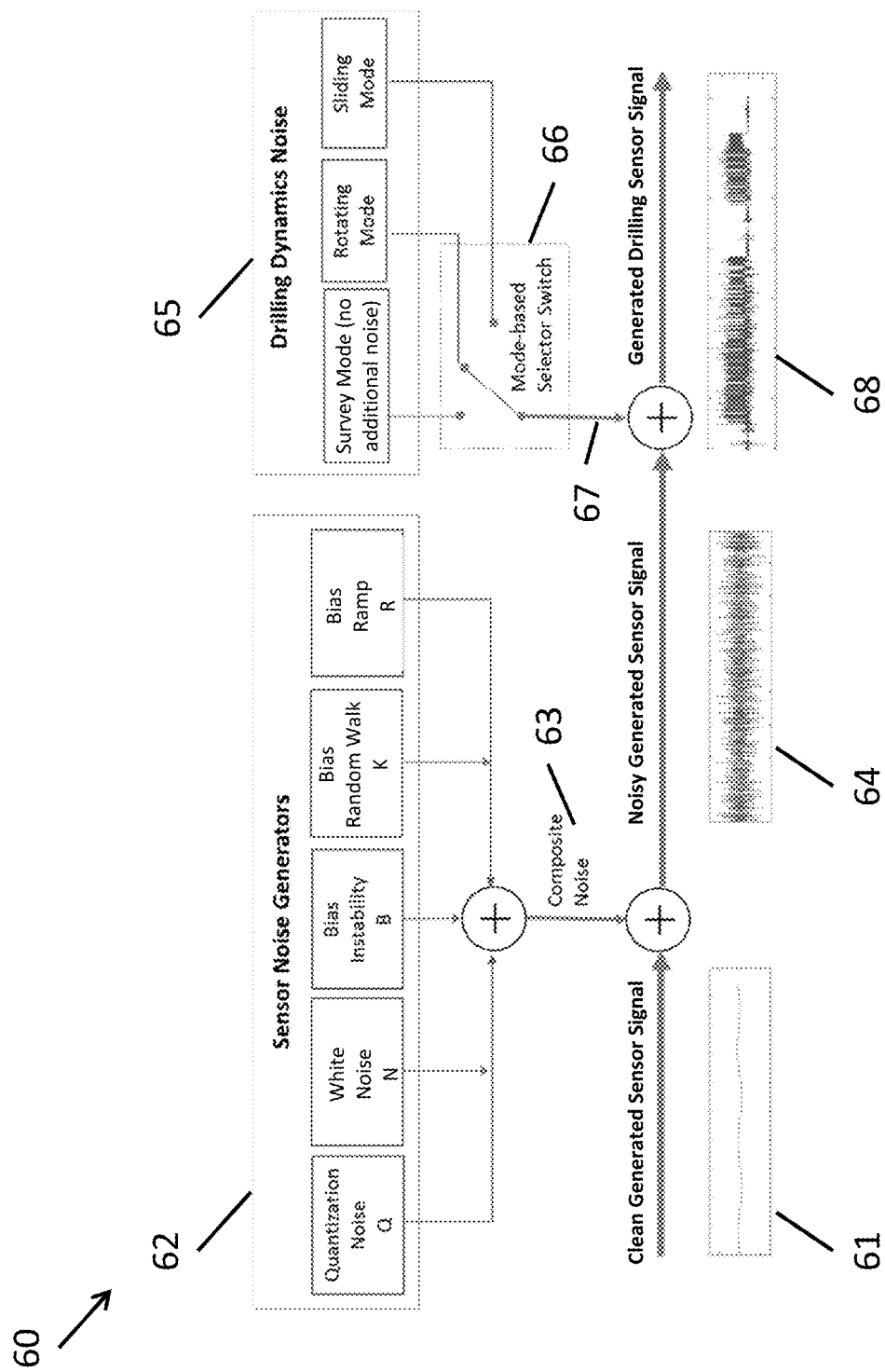
FIG. 18 is a block diagram depicting a downhole IMU noise generator according to one embodiment of the present invention.

FIG. 18 is a block diagram depicting a downhole IMU noise generator 60 according to one embodiment of the present invention. As shown in FIG. 18, in one embodiment, the IMU noise generator 60 includes sensor noise generators 62, including quantization noise (Q), white noise (N), bias instability (B), bias random walk (K), and bias ramp (R) noise generators which are summed to form a composite sensor noise. The composite sensor noise 63 is added to the clean generated sensor signal 61 generated by the sensor output generator 40 to generate a noisy generated sensor signal 64.

In addition, the downhole IMU noise generator 60 includes a drilling noise component 65. The drilling noise component 65 may include three types of noise corresponding to the three drilling modes: survey mode (e.g., a mode where the drill bit is stationary and therefore not drilling, resulting in no drilling noise), a rotating mode (or rotational mode), and a sliding mode. Because the drill bit can only operate in one of these modes at a time, a mode-based selector switch 66 is used to select between the different noise generators in accordance with the current mode of the generated IMU (e.g., for data points corresponding to a rotational mode, the selector switch is set to supply the rotating mode noise, and for data points corresponding to a sliding mode, the selector switch is set to supply the sliding mode noise). The additional noise 67 generated by the drilling noise component is added to the noisy generated sensor signal 64 to generate a drilling sensor signal 68.

Figure 19:
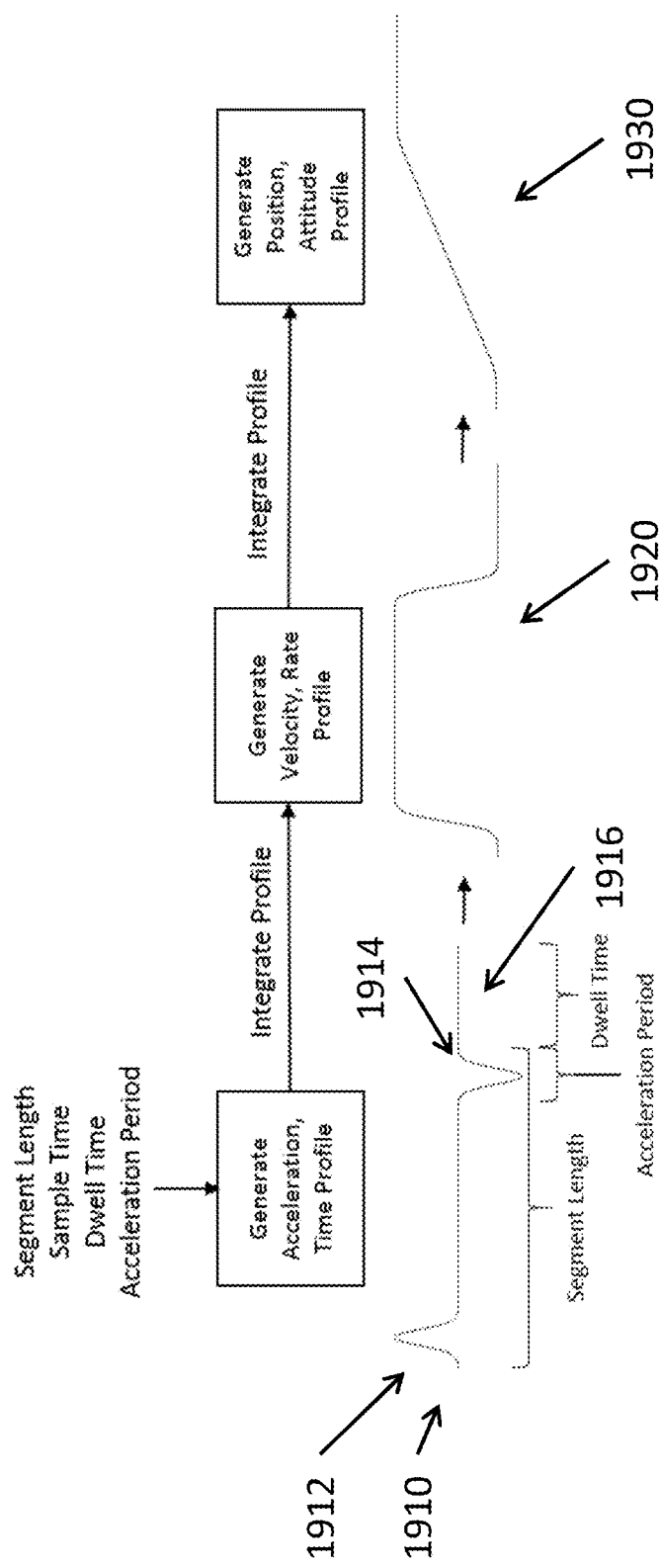
FIG. 19 is a flowchart illustrating the computation of position and attitude profiles to be twice differentiable according to one embodiment of the present invention.

In order for the position and attitude data to be physically plausible, the data points need to be twice differentiable (e.g., no sudden jumps in position or velocity). FIG. 19 is a flowchart illustrating the computation of position and attitude profiles to be twice differentiable according to one embodiment of the present invention. Accordingly, the IMU generator 10 generates an acceleration profile 1910 (e.g., including a positive Gaussian 1912 and a negative Gaussian 1914 followed by a dwell time 1916, where the dwell time represents time spent at the survey points). The acceleration is normalized so that, when it is twice integrated (once to generate velocity and rate profiles 1920, and a second time to generate position and attitude profiles 1930), it creates a position/attitude profile that rises to a value of 1. This acceleration can then be scaled to the desired position or angle.

Figure 20:
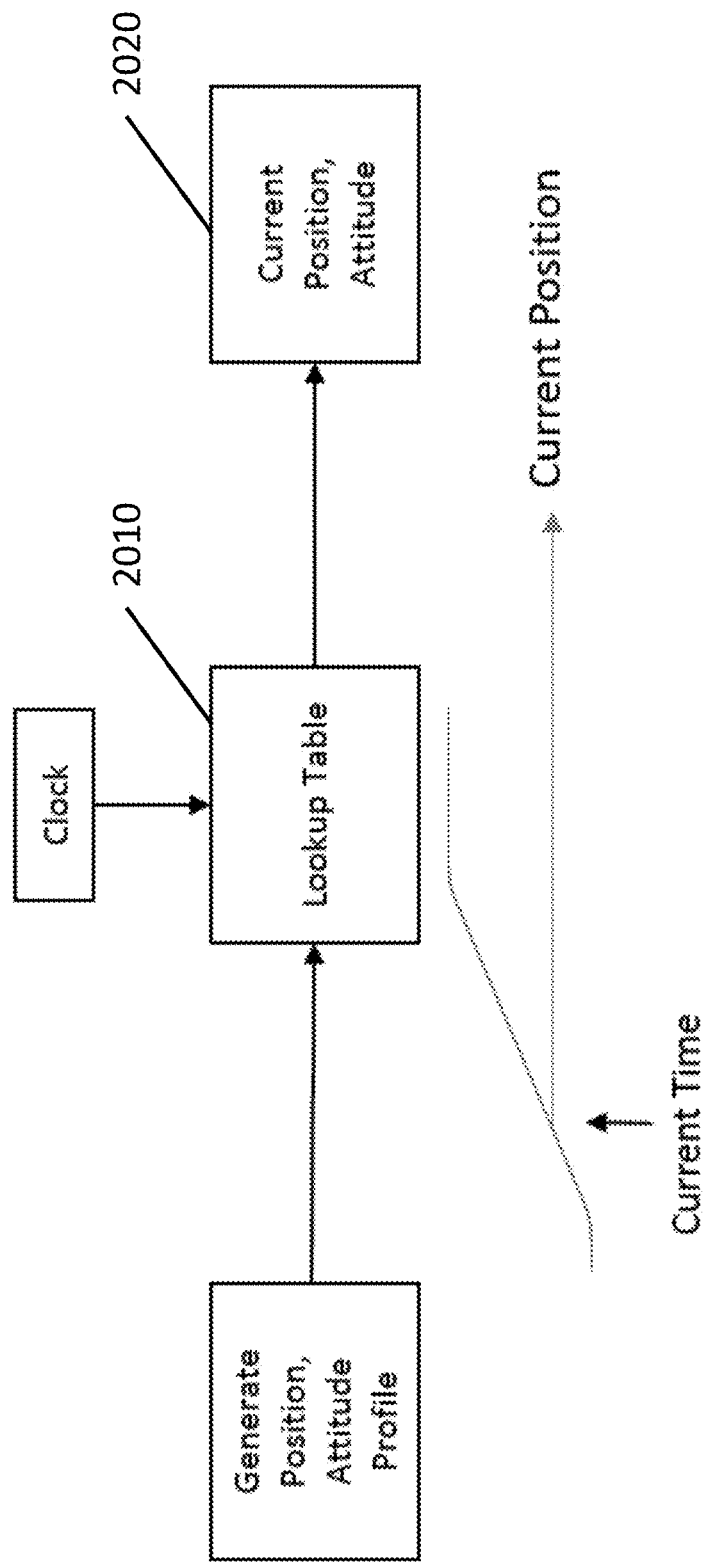
FIG. 20 is a flowchart illustrating the computation of a current position and attitude using a lookup table according to one embodiment of the present invention.

FIG. 20 is a flowchart illustrating the computation of a current position and attitude using a lookup table according to one embodiment of the present invention.

From the position and attitude profiles, a lookup table 2010 is implemented that uses the current time to compute the correct output from the position and attitude profiles 1930. The current position and attitudes 2020 are then fed into a kinematic generator (see, e.g., FIG. 2B) to generate specific forces, angular rates, and magnetic field measurements.

Accordingly, embodiments of the present invention provide systems and methods for generating the output of a downhole inertial measurement unit (IMU).

In some embodiments of the present invention, the downhole inertial measurement unit is implemented on a real-time target machine and is used as hardware-in-the-loop (HIL). According to some embodiments, a real-time target machine is a computer designed and built specifically for a particular application (such as testing an autonomous guidance while drilling system) and may include field programmable gate arrays (FPGAs), vector processors, memory and the like such that the machine will complete all computations to support testing of an IMU in a finite amount of time. Given a drill head, IMU, and an AGWD controller, embodiments of the present invention can be used to provide simulated measurements of acceleration, orientation, and magnetic field to the IMU such that the AGWD controller generates commands to the drill head. Embodiments of the present invention simulate accelerometers, gyroscopes and magnetometers to support hardware-in-the-loop (HIL) simulation. In some embodiments of the present invention, the real-time target machine is configured to send commands to a motion controller to control a nonmagnetic motion simulator apparatus. Accordingly, embodiments of the present invention may be used to test the operation of an autonomous guidance while drilling (AGWD) system that is mounted in the simulator apparatus.

In addition, some embodiments of the present invention have been described above in the context of generating IMU output data such as acceleration data, gyroscopic data, and magnetometer data, embodiments of the present invention are not limited thereto and may also be used to generate other types of data relating to downhole physical conditions. As one example pressure data and measured depth data can also be generated in accordance with the geodetic data. More specifically, in some embodiments pressure data is generated in accordance with depth (e.g., pressure increases with depth) and may also be adjusted based on local conditions (e.g., characteristics of the particular subsurface structures captured through geological studies).

Computer Systems

Various portions of embodiments of the present invention that refer to the use of a "processor" may be implemented with logic gates, or with any other embodiment of a processing unit or processor. The term "processing unit" or "processor" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs).

FIG. 21 is a block diagram illustrating a processing system, a processor, or a portion of a processing system or processor, referred to herein as a computer system, used in conjunction with at least one embodiment of the present invention.

An exemplary computer system 1200 in accordance with an embodiment is shown in FIG. 21. Exemplary computer system 1200 is configured to perform calculations, processes, operations, and/or functions associated with a program or algorithm. In one embodiment, certain processes and steps discussed herein are realized as a series of instructions (e.g., software program) that reside within computer readable memory units and are executed by one or more processors of exemplary computer system 1200. When executed, the instructions cause exemplary computer system 1200 to perform specific actions and exhibit specific behavior, such as described herein.

Exemplary computer system 1200 may include an address/data bus 1210 that is configured to communicate information. Additionally, one or more data processing unit, such as processor 1220, are coupled with address/data bus 1210. Processor 1220 is configured to process information and instructions. In an embodiment, processor 1220 is a microprocessor. Alternatively, processor 1220 may be a different type of processor such as a parallel processor, or a field programmable gate array.

Exemplary computer system 1200 is configured to utilize one or more data storage units. Exemplary computer system 1200 may include a volatile memory unit 1230 (e.g., random access memory ("RAM"), static RAM, dynamic RAM, etc.) coupled with address/data bus 1210, wherein volatile memory unit 1230 is configured to store information and instructions for processor 1220. Exemplary computer system 1200 further may include a non-volatile memory unit 1240 (e.g., read-only memory ("ROM"), programmable ROM ("PROM"), erasable programmable ROM ("EPROM"), electrically erasable programmable ROM "EEPROM"), flash memory, etc.) coupled with address/data bus 1210, wherein non-volatile memory unit 1240 is configured to store static information and instructions for processor 1220. Alternatively exemplary computer system 1200 may execute instructions retrieved from an online data storage unit such as in "Cloud" computing. In an embodiment, exemplary computer system 1200 also may include one or more interfaces, such as interface 1250, coupled with address/data bus 1210. The one or more interfaces are configured to enable exemplary computer system 1200 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one embodiment, exemplar computer system 1200 may include an input device 1260 coupled with address/data bus 1210, wherein input device 1260 is configured to communicate information and command selections to processor 1220. In accordance with one embodiment, input device 1260 is an alphanumeric input device, such as a keyboard, that may include alphanumeric and/or function keys. Alternatively, input device 1260 may be an input device other than an alphanumeric input device. In an embodiment, exemplar computer system 1200 may include a cursor control device 1270 coupled with address/data bus 1210, wherein cursor control device 1270 is configured to communicate user input information and/or command selections to processor 1220. In an embodiment, cursor control device 1270 is implemented using a device such as a mouse, a track-ball, a track-pad, an optical tracking device, or a touch screen. The foregoing notwithstanding, in an embodiment, cursor control device 1270 is directed and/or activated via input from input device 1260, such as in response to the use of special keys and key sequence commands associated with input device 1260. In an alternative embodiment, cursor control device 1270 is configured to be directed or guided by voice commands.

In an embodiment, exemplary computer system 1200 further may include one or more optional computer usable data storage devices, such as storage device 1280, coupled with address/data bus 1210. Storage device 1280 is configured to store information and/or computer executable instructions. In one embodiment, storage device 1280 is a storage device such as a magnetic or optical disk drive (e.g., hard disk drive ("HDD"), floppy diskette, compact disk read only memory ("CD-ROM"), digital versatile disk ("DVD")). Pursuant to one embodiment, a display device 1290 is coupled with address/data bus 1210, wherein display device 1290 is configured to display video and/or graphics. In an embodiment, display device 1290 may include a cathode ray tube ("CRT"), liquid crystal display ("LCD"), field emission display ("FED"), plasma display or any other display device suitable for displaying video and/or graphic images and alphanumeric characters recognizable to a user.

Exemplary computer system 1200 is presented herein as an exemplary computing environment in accordance with an embodiment. However, exemplary computer system 1200 is not strictly limited to being a computer system. For example, an embodiment provides that exemplary computer system 1200 represents a type of data processing analysis that may be used in accordance with various embodiments described herein. Moreover, other computing systems may also be implemented. Indeed, the spirit and scope of the present technology is not limited to any single data processing environment. Thus, in an embodiment, one or more operations of various embodiments of the present technology are controlled or implemented using computer-executable instructions, such as program modules, being executed by a computer. In one exemplary implementation, such program modules include routines, programs, objects, components and/or data structures that are configured to perform particular tasks or implement particular abstract data types. In addition, an embodiment provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for generating an output of a downhole inertial measurement unit (IMU) comprising:
generating a trajectory between a plurality of survey points of a planned well data as a function of time, the planned well data comprising a plurality of three-dimensional coordinates corresponding to the survey points of an underground planned well, the trajectory comprising a plurality of trajectory coordinates between consecutive ones of the survey points, the trajectory coordinates being generated based on the three-dimensional coordinates corresponding to the survey points;
generating sensor data for each of the trajectory coordinates as a function of time based on the trajectory coordinates and geodetic reference parameters, the generated sensor data comprising: generated accelerometer output comprising simulated acceleration measurements; generated gyroscopic output comprising simulated orientation measurements; and generated magnetometer output comprising simulated magnetic field measurements; and
outputting the generated accelerometer output; the generated gyroscopic output; and the generated magnetometer output as a function of time as a generated output of the downhole IMU.

2. The method of claim 1, wherein the generating the trajectory between survey points is performed at a time step of 1 per second to 1000 per second.

3. The method of claim 1, wherein each of the generated trajectory coordinates comprises a three-dimensional position, a three-dimensional orientation, and a timestamp.

4. The method of claim 3, wherein each three-dimensional orientation comprises an azimuthal angle, an inclination angle, and a toolface angle of a drill bit.

5. The method of claim 3, further comprising:
generating the accelerometer output in accordance with the three-dimensional positions and the timestamps of the trajectory coordinates;
generating the gyroscopic output in accordance with the three-dimensional orientation and the timestamps of the trajectory coordinates; and
generating the magnetometer output in accordance with:
the geodetic reference parameters; and
the three-dimensional positions and the timestamps of the trajectory coordinates.

6. The method of claim 5, wherein the generating the accelerometer output comprises converting generated accelerometer data from a navigation frame to a body frame of a drill bit,
wherein the generating the gyroscopic output comprises converting generated gyroscopic data from the navigation frame to the body frame of the drill bit, and
wherein the generating the magnetometer output comprises converting generated magnetometer output from the navigation frame to the body frame of the drill bit.

7. The method of claim 1, further comprising:
receiving sensor noise parameters; and
adding sensor noise to the generated accelerometer output, the generated gyroscopic output, and the generated magnetometer output.

8. The method of claim 7, wherein the sensor noise comprises at least one of:
quantization noise;
white noise;
bias instability;
bias random walk; and
bias ramp.

9. The method of claim 7, further comprising, between each consecutive pair of survey points:
determining whether the trajectory between the consecutive pair of survey points is a rotational mode trajectory or a sliding mode trajectory;
in response to determining the rotational mode trajectory, adding rotational mode drilling noise to the generated accelerometer output, the generated gyroscopic output, and the generated magnetometer output; and
in response to determining the sliding mode trajectory, adding sliding mode drilling noise to the generated accelerometer output, the generated gyroscopic output, and the generated magnetometer output.

10. The method of claim 1, further comprising verifying the generated output of the IMU by:
supplying the generated accelerometer output, the generated gyroscopic output, and generated magnetometer output to an inertial navigation system (INS) to generate an INS system trajectory; and
verifying the generated output of the IMU when a difference between the INS system trajectory and the trajectory computed from the planned well data is below a threshold value.

11. The method of claim 1, wherein the sensor data further comprises pressure data.

12. A system for generating the data output of a downhole inertial measurement unit (IMU) comprising:
a processor; and
a memory storing instructions that, when executed by the processor, cause the processor to:
generate a trajectory between survey points of planned well data as a function of time, the planned well data comprising a plurality of three-dimensional coordinates corresponding to the survey points of an underground planned well, the trajectory comprising a plurality of trajectory coordinates between consecutive ones of the survey points, the trajectory coordinates being generated based on the three-dimensional coordinates corresponding to the survey points; and
generate sensor data for each of the trajectory coordinates as a function of time based on the trajectory coordinates and geodetic reference parameters, the generated sensor data comprising: generated accelerometer output comprising simulated acceleration measurements; generated gyroscopic output comprising simulated orientation measurements; and generated magnetometer output comprising simulated magnetic field measurements.

13. The system of claim 12, wherein the system is implemented on a real-time target machine and used as hardware-in-the-loop.

14. The system of claim 13, wherein the real-time target machine is configured to send commands to a motion controller to control a nonmagnetic motion simulator apparatus.

15. The system of claim 12, wherein each of the generated trajectory coordinates comprises a three-dimensional position, a three-dimensional orientation, and a timestamp.

16. The system of claim 15, wherein each three-dimensional orientation comprises an azimuthal angle, an inclination angle, and a toolface angle of a drill bit.

17. The system of claim 15, wherein the memory further stores instructions that, when executed by the processor, cause the processor to:
compute the generated accelerometer output in accordance with the three-dimensional positions and the timestamps of the trajectory coordinates, compute the generated gyroscopic output in accordance with the three-dimensional orientation and the timestamps of the trajectory coordinates; and compute the generated magnetometer output in accordance with:
the geodetic reference parameters; and
the three-dimensional positions and the timestamps of the trajectory coordinates.

18. The system of claim 17, wherein the instructions for computing the generated accelerometer output comprise instructions that, when executed by the processor, cause the processor to convert generated accelerometer data from a navigation frame to a body frame of a drill bit,
wherein the instructions for computing the generated gyroscopic output comprise instructions that, when executed by the processor, cause the processor to convert generated gyroscopic data from the navigation frame to the body frame of the drill bit, and
wherein the instructions for computing the generated magnetometer output comprise instructions that, when executed by the processor, cause the processor to convert generated magnetometer output from the navigation frame to the body frame of the drill bit.

19. The system of claim 12, wherein the memory further stores instructions that, when executed by the processor, cause the processor to:
receive sensor noise parameters; and
add sensor noise to the generated accelerometer output, the generated gyroscopic output, and the generated magnetometer output.

20. The system of claim 19, wherein the sensor noise comprises at least one of:
quantization noise;
white noise;
bias instability;
bias random walk; and
bias ramp.

21. The system of claim 19, wherein the memory further stores instructions that, when executed by the processor, cause the processor to, between each consecutive pair of survey points:
determine whether the trajectory between the consecutive pair of survey points is a rotational mode trajectory or a sliding mode trajectory;
in response to determining the rotational mode trajectory, add rotational mode drilling noise to the generated accelerometer output, the generated gyroscopic output, and the generated magnetometer output; and
in response to determining the sliding mode trajectory, add sliding mode drilling noise to the generated accelerometer output, the generated gyroscopic output, and the generated magnetometer output.

22. The system of claim 12, wherein the memory further stores instructions that, when executed by the processor, cause the processor to verify the generated output of the IMU by:
supplying the generated accelerometer output, the generated gyroscopic output, and generated magnetometer output to an inertial navigation system (INS) to generate an INS system trajectory; and
verifying the generated output of the IMU when a difference between the INS system trajectory and the trajectory computed from the planned well data is below a threshold value.

23. A non-transitory computer readable medium having instructions stored thereon that, when executed by a processor, cause the processor to:
generate a trajectory between survey points of planned well data as a function of time, the planned well data comprising a plurality of three-dimensional coordinates corresponding to the survey points of an underground planned well, the trajectory comprising a plurality of trajectory coordinates between consecutive ones of the survey points, the trajectory coordinates being generated based on the three-dimensional coordinates corresponding to the survey points; and
generate sensor data for each of the trajectory coordinates as a function of time based on the trajectory coordinates and geodetic reference parameters, the generated sensor data comprising: generated accelerometer output comprising simulated acceleration measurements; generated gyroscopic output comprising simulated orientation measurements; and generated magnetometer output comprising simulated magnetic field measurements.

* * * * *